US012794861B2

(12) United States Patent
Nachbaur

(10) Patent No.: US 12,794,861 B2
(45) Date of Patent: Nov. 10, 2026

(54) SECURE REQUEST TRANSPORT ACROSS TRANSPORT LAYER CONNECTIONS

(71) Applicant: OKTA, INC., San Francisco, CA (US)

(72) Inventor: Alexandra Minerva Nachbaur, Surrey (CA)

( * ) Notice: Subject to any disclaimer, the term of this patent is extended or adjusted under 35 U.S.C. 154(b) by 113 days.

(21) Appl. No.: 18/645,157

(22) Filed: Apr. 24, 2024

(65) Prior Publication Data

US 2025/0337717 A1 Oct. 30, 2025

(51) Int. Cl.
*H04L 9/40* (2022.01)
*H04L 9/30* (2006.01)
*H04L 9/32* (2006.01)

(52) U.S. Cl.
CPC ........ *H04L 63/0428* (2013.01); *H04L 9/3073* (2013.01); *H04L 9/3213* (2013.01); *H04L 63/166* (2013.01)

(58) Field of Classification Search
CPC . H04L 63/0428; H04L 9/3073; H04L 9/3213; H04L 63/166
See application file for complete search history.

(56) References Cited

U.S. PATENT DOCUMENTS

2005/0050329 A1* 3/2005 Wilding ................ H04L 63/061 713/171
2018/0198606 A1* 7/2018 Le Saint ................... H04L 9/14
2022/0417241 A1* 12/2022 Zilbershtein .......... H04L 9/3247
2023/0155990 A1* 5/2023 Kim ........................ H04L 63/00 713/163

* cited by examiner

*Primary Examiner* — Henry Tsang
(74) *Attorney, Agent, or Firm* — Holland & Hart LLP

(57) ABSTRACT

A method for message encryption between a hypertext transfer protocol (HTTP) server and a client device is described. The method may include generating, by the client device, a demonstration of proof-of-possession (DPoP) including a signature of a first public key of a first keypair associated with the HTTP server, where the HTTP server has a first private key of the first keypair. The client device may transmit, to the HTTP server, a request including the DPoP of the client device. The HTTP server may transmit a response based on receiving the request, where the response includes an indication that one or more sections of the response are encrypted using a second public key of a second keypair of the client device, where the client device has a second private key of the second keypair. The client device may decrypt the response using the second private key.

18 Claims, 13 Drawing Sheets

SECURE REQUEST TRANSPORT ACROSS TRANSPORT LAYER CONNECTIONS

FIELD OF TECHNOLOGY

The present disclosure relates generally to identity management, and more specifically to secure request transport across transport layer connections.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials. In some cases, a client and a server may exchange data via a transport layer security (TLS) connection.

SUMMARY

The described techniques relate to improved methods, systems, devices, and apparatuses that support secure request transport across transport layer connections. For example, such techniques may provide a framework for securely exchanging data between a client and a server, such as an authorization server or a resource server, via an untrusted transport layer security (TLS) connection. In some examples, a client may generate a demonstration of proof-of-possession (DPoP) including a signature of a first public key of a first keypair associated with the server, where the server has a first private key of the first keypair. The client may transmit, to the server, a request including the DPoP of the client. The server may transmit a response based on receiving the request, where the response includes an indication that one or more sections of the response are encrypted using a second public key of a second keypair of the client, where the client has a second private key of the second keypair. The client may decrypt the response using the second private key. Prior to transmission of the request, the client and the server may exchange public keys (e.g., implicitly) via transmission of a DPoP header in a message by the client and transmission of an access token by the server.

A method for message encryption between a hypertext transfer protocol (HTTP) server and a client device by an apparatus is described. The method may include generating, by the client device, a DPoP including a signature of a first public key of a first keypair associated with the HTTP server, where the HTTP server has a first private key of the first keypair, transmitting, to the HTTP server, a request including the demonstration of proof-of possession of the client device, receiving a response from the HTTP server based on transmitting the request, the response including an indication that one or more sections of the response are encrypted using a second public key of a second keypair of the client device, and decrypting, based on the response including the indication, the response using a second private key of the second keypair of the client device.

An apparatus for message encryption between a HTTP server and a client device is described. The apparatus may include one or more memories storing processor executable code, and one or more processors coupled with the one or more memories. The one or more processors may individually or collectively be operable to execute the code to cause the apparatus to generate, by the client device, a DPoP including a signature of a first public key of a first keypair associated with the HTTP server, where the HTTP server has a first private key of the first keypair, transmit, to the HTTP server, a request including the demonstration of proof-of possession of the client device, receive a response from the HTTP server based on transmitting the request, the response including an indication that one or more sections of the response are encrypted using a second public key of a second keypair of the client device, and decrypting, based at least in part on the response including the indication, the response using a second private key of the second keypair of the client device.

Another apparatus for message encryption between a HTTP server and a client device is described. The apparatus may include means for generating, by the client device, a DPoP including a signature of a first public key of a first keypair associated with the HTTP server, where the HTTP server has a first private key of the first keypair, means for transmitting, to the HTTP server, a request including the demonstration of proof-of possession of the client device, means for receiving a response from the HTTP server based on transmitting the request, the response including an indication that one or more sections of the response are encrypted using a second public key of a second keypair of the client device, and means for decrypting, based on the response including the indication, the response using a second private key of the second keypair of the client device.

A non-transitory computer-readable medium storing code for message encryption between a HTTP server and a client device is described. The code may include instructions executable by one or more processors to generate, by the client device, a DPoP including a signature of a first public key of a first keypair associated with the HTTP server, where the HTTP server has a first private key of the first keypair, transmit, to the HTTP server, a request including the demonstration of proof-of possession of the client device, receive a response from the HTTP server based on transmitting the request, the response including an indication that one or more sections of the response are encrypted using a second public key of a second keypair of the client device, and decrypting, based at least in part on the response including the indication, the response using a second private key of the second keypair of the client device.

Some examples of the method, apparatus, and non-transitory computer-readable medium described herein may further include operations, features, means, or instructions for encrypting one or more second sections of a second response to the response using the first public key of the first keypair associated with the HTTP server and transmitting the second response to the response, where the second response includes a second indication that one or more second sections of the second response may be encrypted using the first public key of the first keypair associated with the HTTP server.

Some examples of the method, apparatus, and non-transitory computer-readable medium described herein may further include operations, features, means, or instructions for updating a content type of the request to include the second indication based on generating the DPoP.

Some examples of the method, apparatus, and non-transitory computer-readable medium described herein may further include operations, features, means, or instructions for encrypting one or more second sections of the request using the first public key of the first keypair associated with the HTTP server, wherein the encrypting comprises encrypting a body of the request, one or more headers of the request, or both using the first public key.

Some examples of the method, apparatus, and non-transitory computer-readable medium described herein may further include operations, features, means, or instructions for transmitting, to the HTTP server prior to transmission of the request, a message including a DPoP header, the DPoP header indicative of the second public key of the second keypair of the client device having the second private key of the second keypair.

Some examples of the method, apparatus, and non-transitory computer-readable medium described herein may further include operations, features, means, or instructions for receiving, from the HTTP server and based on sharing the second public key of the second keypair of the client device, an access token bound to an identity of the client device via inclusion of information associated with the second public key.

Some examples of the method, apparatus, and non-transitory computer-readable medium described herein may further include operations, features, means, or instructions for receiving, from the HTTP server, an access token including information associated with the first public key of the HTTP server and identifying the first public key of the HTTP server based on receiving the access token.

In some examples of the method, apparatus, and non-transitory computer-readable medium described herein, the access token includes a JSON Web Token (JWT) and the information associated with the first public key includes a signature of the JWT.

In some examples of the method, apparatus, and non-transitory computer-readable medium described herein, receiving the response may include operations, features, means, or instructions for receiving the response from the HTTP server based on a validation of the DPoP via the first private key of the first keypair of the HTTP server.

Some examples of the method, apparatus, and non-transitory computer-readable medium described herein may further include operations, features, means, or instructions for transmitting the request, receiving the response, or both may be performed via an untrusted TLS connection.

In some examples of the method, apparatus, and non-transitory computer-readable medium described herein, the one or more sections of the response may be indicated as encrypted via an extension or value included in content of the response preceding the one or more sections.

In some examples of the method, apparatus, and non-transitory computer-readable medium described herein, the DPoP further includes, in addition to the signature of the first public key, a uniform resource identifier (URI), a HTTP, a timestamp, an expiration time, a unique identifier, or any combination thereof associated with the request.

A method for message encryption between a HTTP server and a client device by an apparatus is described. The method may include receiving, from the client device, a request including a DPoP of the client device signed using a first public key of a first keypair associated with the HTTP server, where the HTTP server has a first private key of the first keypair, updating a content type of a response to include an indication that one or more sections of the response are encrypted using a second public key of a second keypair associated with the client device having a second private key of the second keypair based on receiving the request, encrypting, in accordance with the indication, the one or more sections of the response using the second public key of the second keypair associated with the client device, and transmitting, to the client device, the response including the one or more encrypted sections based on receiving the request including the DPoP.

An apparatus for message encryption between a HTTP server and a client device is described. The apparatus may include one or more memories storing processor executable code, and one or more processors coupled with the one or more memories. The one or more processors may individually or collectively be operable to execute the code to cause the apparatus to receive, from the client device, a request including a DPoP of the client device signed using a first public key of a first keypair associated with the HTTP server, where the HTTP server has a first private key of the first keypair, update a content type of a response to include an indication that one or more sections of the response are encrypted using a second public key of a second keypair associated with the client device having a second private key of the second keypair based on receiving the request, encrypting, in accordance with the indication, the one or more sections of the response used the second public key of the second keypair associated with the client device, and transmit, to the client device, the response including the one or more encrypted sections based on receiving the request including the DPoP.

Another apparatus for message encryption between a HTTP server and a client device is described. The apparatus may include means for receiving, from the client device, a request including a DPoP of the client device signed using a first public key of a first keypair associated with the HTTP server, where the HTTP server has a first private key of the first keypair, means for updating a content type of a response to include an indication that one or more sections of the response are encrypted using a second public key of a second keypair associated with the client device having a second private key of the second keypair based on receiving the request, means for encrypting, in accordance with the indication, the one or more sections of the response using the second public key of the second keypair associated with the client device, and means for transmitting, to the client device, the response including the one or more encrypted sections based on receiving the request including the DPoP.

A non-transitory computer-readable medium storing code for message encryption between a HTTP server and a client device is described. The code may include instructions executable by one or more processors to receive, from the client device, a request including a DPoP of the client device signed using a first public key of a first keypair associated with the HTTP server, where the HTTP server has a first private key of the first keypair, update a content type of a response to include an indication that one or more sections of the response are encrypted using a second public key of a second keypair associated with the client device having a second private key of the second keypair based on receiving the request, encrypting, in accordance with the indication, the one or more sections of the response used the second public key of the second keypair associated with the client device, and transmit, to the client device, the response including the one or more encrypted sections based on receiving the request including the DPoP.

In some examples of the method, apparatus, and non-transitory computer-readable medium described herein, encrypting the one or more sections may include operations, features, means, or instructions for encrypting a body of the response, one or more headers of the response, or both using the second public key.

Some examples of the method, apparatus, and non-transitory computer-readable medium described herein may further include operations, features, means, or instructions for receiving, from the client device prior to receipt of the request, a message including a DPoP header, the DPoP header indicative of the second public key of the second keypair of the client device having the second private key of the second keypair.

Some examples of the method, apparatus, and non-transitory computer-readable medium described herein may further include operations, features, means, or instructions for transmitting, to the client device and based on receiving the second public key of the second keypair of the client device, an access token bound to an identity of the client device via inclusion of information associated with the second public key.

Some examples of the method, apparatus, and non-transitory computer-readable medium described herein may further include operations, features, means, or instructions for transmitting, to the client device, an access token including information associated with the first public key of the HTTP server, where receiving the request including the DPoP of the client device signed using the first public key may be based on transmitting the access token.

In some examples of the method, apparatus, and non-transitory computer-readable medium described herein, the access token includes a JWT and the information associated with the first public key includes a signature of the JWT.

Some examples of the method, apparatus, and non-transitory computer-readable medium described herein may further include operations, features, means, or instructions for validating the DPoP using the first private key of the first keypair of the HTTP server, where transmitting the response may be based on validating the DPoP.

In some examples of the method, apparatus, and non-transitory computer-readable medium described herein, decrypting, based on the request including a second indication that one or more second sections of the request may be encrypted using the first public key of the first keypair associated with the HTTP server, the one or more second sections of the request using the first private key of the first keypair of the HTTP server, where transmitting the response may be based on decrypting the one or more second sections of the request.

Some examples of the method, apparatus, and non-transitory computer-readable medium described herein may further include operations, features, means, or instructions for encrypting the one or more sections may be based on a second indication of the request, an encryption of the request, or both.

Some examples of the method, apparatus, and non-transitory computer-readable medium described herein may further include operations, features, means, or instructions for receiving the request, transmitting the response, or both may be performed via an untrusted TLS connection.

In some examples of the method, apparatus, and non-transitory computer-readable medium described herein, the one or more sections of the response may be indicated as encrypted via an extension or value included in content of the response preceding the one or more sections.

In some examples of the method, apparatus, and non-transitory computer-readable medium described herein, the DPoP further includes, in addition to a signature of the first public key, a URI, a HTTP, a timestamp, an expiration time, a unique identifier, or any combination thereof associated with the request.

DETAILED DESCRIPTION

Figure 1:
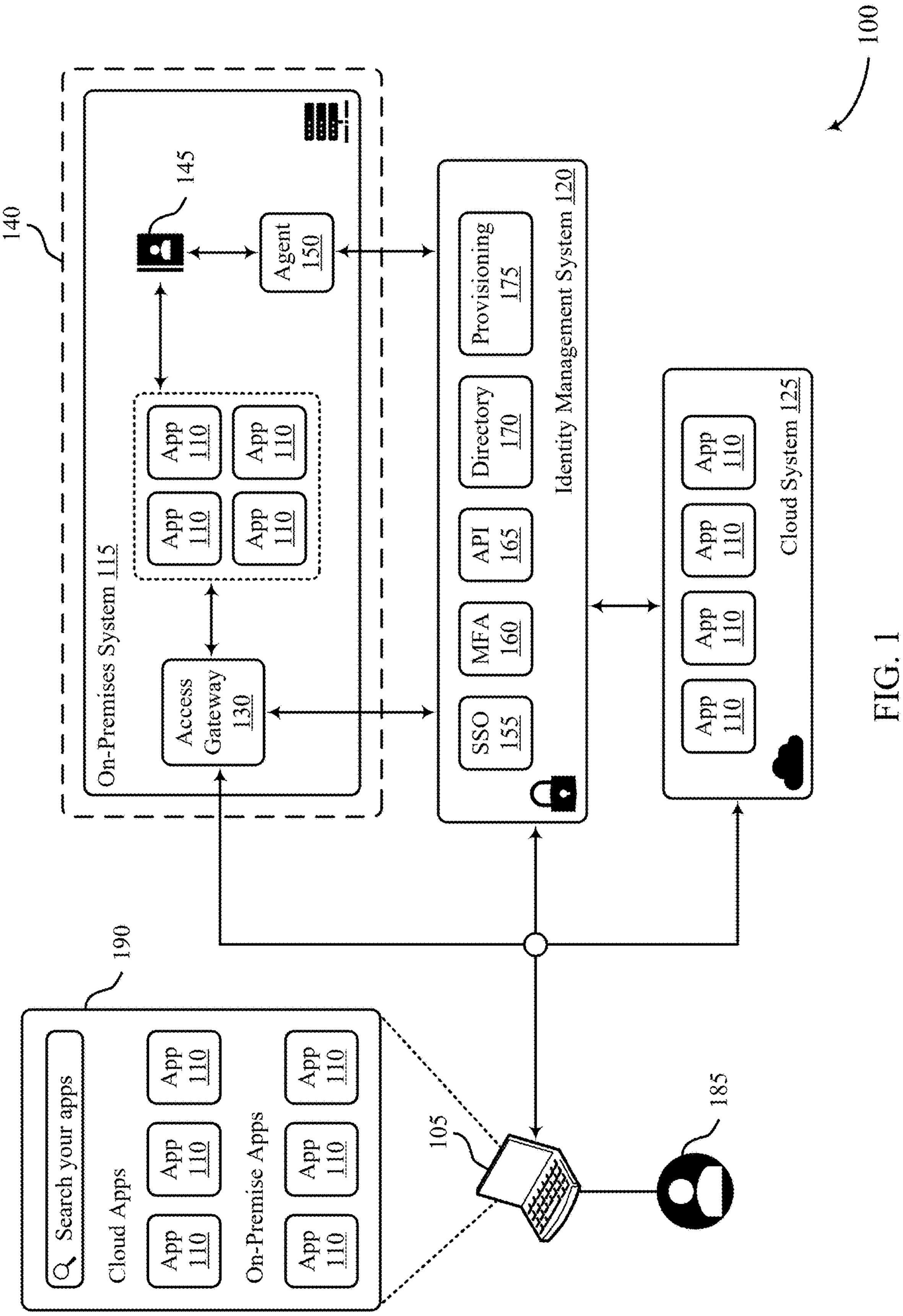
FIGS. 1 and 2 show examples of computing systems that support secure request transport across transport layer connections in accordance with aspects of the present disclosure.

In some computing systems, a client may communicate with a server via a transport layer security (TLS) connection. For example, the client and server may communicate according to a TLS protocol in which the client and server may establish a trusted connection via a handshake procedure. The handshake procedure may include a request by the client to establish a secure connection and identification of the server via a digital certificate. The digital certificate may indicate a certificate authority (CA), such as a root-level CA, which issued the certificate, an indication of a public key of the server (e.g., a signature), or both. For example, the digital certificate may include a signature of the public key (e.g., generated by a private key of a keypair, the keypair including the public key and the private key) such that the digital certificate may be identified as modified or tampered with. That is, the client may verify a validity of the digital certificate by verifying the signature of the public key using the public key of the server.

In some cases, an attacker may replace the CA with a new CA (e.g., a new root-level CA) in a certificate injection attack. For example, the new CA of the attacker may be used by a decrypting proxy (e.g., a decrypting hypertext transfer protocol secure (HTTPS)) to decrypt, read, and re-encrypt data exchanged between the client and the server. The intercepted data may be used to perform a man-in-the-middle or person-in-the-middle attack in which data exchanged between the client and the server modified, a replay attack in which a request sent by the client is reused by an attacker to obtain information from the server, or both. As an example, the attacker may replace the CA with the new CA via installation of a virtual private network (VPN) service by the client.

As described herein, a client and server may exchange data via an untrusted TLS connection via token binding (e.g., a demonstration of proof-of-possession (DPoP) protocol) and implicit key exchange. That is, the client and server may exchange data via the untrusted TLS connection (e.g., or a TLS connection in which trust is unknown) such that data, both being exchanged and stored, may not be accessed by an unauthorized party. For example, the client may indicate a first public key associated with a first keypair of the client to the server via a DPoP header, and the server may indicate a second public key associated with a second keypair of the server to the client via an access token. That is, the DPoP header may include information about the first public key of the client, and the access token may include information about the second public key of the server.

The access token may be bound to the identity of the client (e.g., via token binding) by inclusion of information associated with the first public key of the first keypair of the client. The client and server, after implicitly exchanging public keys via the DPoP header and access token, may encrypt data exchanged via the TLS connection. For example, the client may transmit a request to the server, where the request includes a DPoP including a signature of the second public key associated with the second keypair of the server. The server may respond to the request based on validating the DPoP header using a second private key of the second keypair. The server may respond to the request, where the response includes one or more sections encrypted using the first public key of the first keypair of the client. For example, the client may decrypt the one or more sections of the response using a first private key of the first keypair.

Using the implicit key exchange via the DPoP header and the access token to encrypt sensitive content exchanged between the client and the server may lead to increased security and improved user experience related to reduced processing and overhead. For example, the client and the server may improve security by encrypting sensitive content to be decrypted using a private key of a recipient of the data. Encryption via a public key of a keypair including a private key held by the recipient of the data may be associated with increased security related to man-in-the-middle attacks, replay attacks, and/or certificate injection attacks. Additionally, the client and the server may reduce processing and overhead by encrypting the sensitive content and refraining from encrypting other content. That is, the client and the server may reduce processing complexity by encrypting content identified as including sensitive information (e.g., rather than all data) and reduce overhead associated with exchanging data by exchanging some data in an unencrypted form.

Aspects of the disclosure are initially described in the context of computing systems. Aspects of the disclosure are also described in the context of a process flow. Aspects of the disclosure are further illustrated by and described with reference to apparatus diagrams, system diagrams, and flowcharts that relate to secure request transport across transport layer connections.

FIG. 1 illustrates an example of a computing system 100 that supports secure request transport across transport layer connections in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using HTTP headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The identity management system 120 may support secure request transport across transport layer connections between a client and a server. The server may be an example of an authorization server or a resource server, where the client may be granted access to the resource server by the authorization server. For example, the identity management system 120 may support the authorization server (e.g., or the resource server accessible to the client via the authorization server) in communication with a client, where the authorization server exchanges encrypted data with the client based on an implicit key exchange. The implicit key exchange may involve the client sharing a public key with the authorization server via a DPoP header and the authorization server sharing a public key with the client via an access token. The client and the authorization server may encrypt data using a public key of a recipient such that the data may be decrypted by a holder of the private key corresponding to the public key. As an example, the authorization server may respond to a request from the client including a DPoP signed using a public key of the authorization server with a message including at least a portion which is encrypted using a public key of the client.

Figure 2:
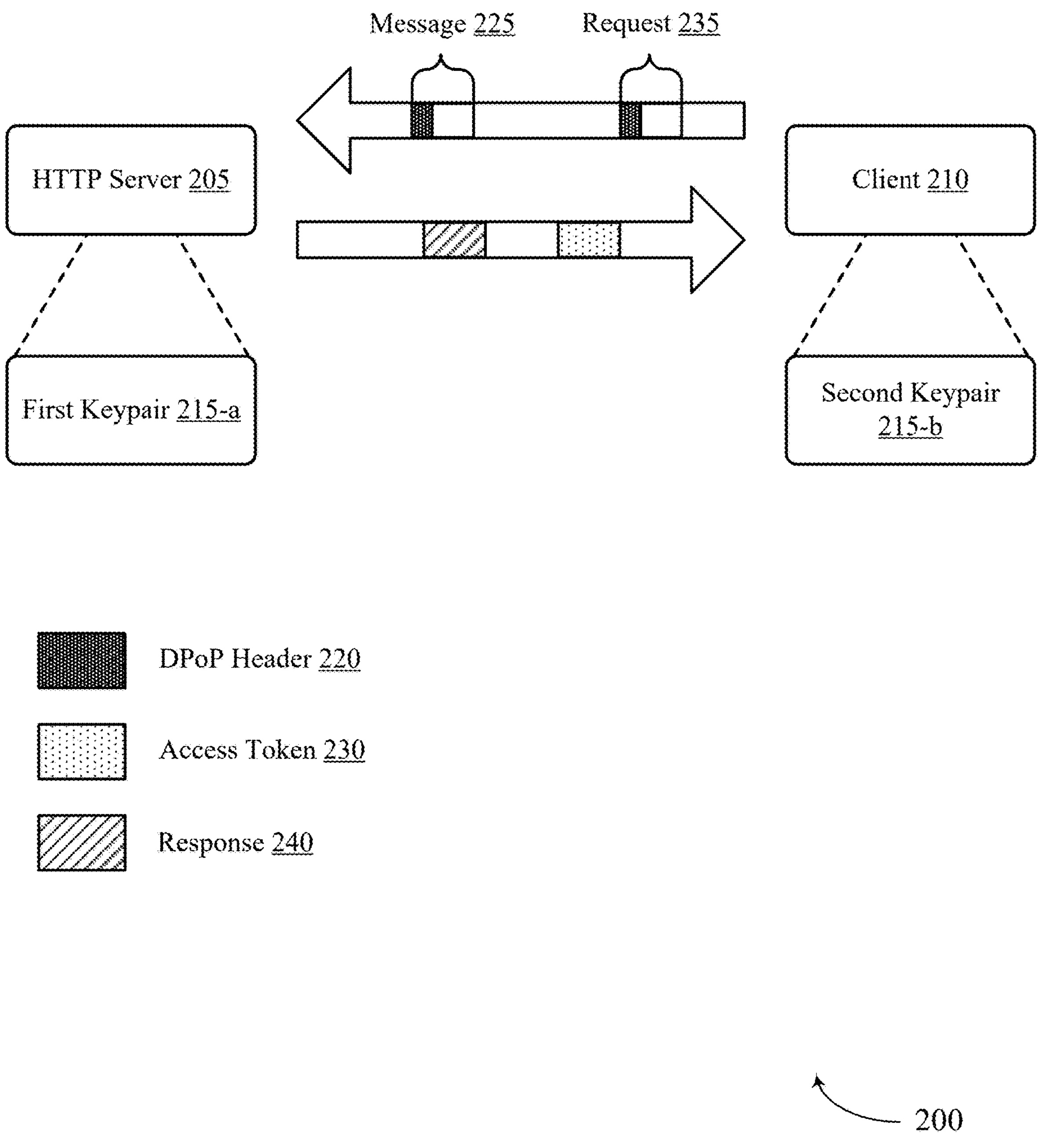

FIG. 2 shows an example of a computing system 200 that supports secure request transport across transport layer connections in accordance with aspects of the present disclosure. In some examples, the computing system 200 may implement or be implemented by aspects of the computing system 100. For example, the computing system 200 may include an HTTP server 205 which may be an example of a server of the identity management system 120 as described with reference to FIG. 1. That is, the HTTP server 205 may be an example of an authorization server of the identity management system 120.

The HTTP server 205 and the client 210 may share public keys (e.g., implicitly) via an OpenID Connect (OIDC) protocol and a DPoP protocol. For example, the HTTP server 205 may be associated with a first keypair 215-*a*, where the first keypair 215-*a* includes a first private key and a first public key. The client 210 may be associated with a second keypair 215-*b*, where the second keypair 215-*b* includes a second private key and a second public key. The HTTP server 205 and the client 210 may encrypt messages using the private key of an intended recipient. That is, the HTTP server 205 may encrypt messages using the second private key of the second keypair 215-*b* of the client 210, and the client 210 may encrypt messages using the first private key of the first keypair 215-*a* of the HTTP server 205.

To share the first public key of the first keypair 215-*a* with the client 210, the HTTP server 205 may transmit an access token 230. For example, the HTTP server 205 may transmit the access token 230 (e.g., and an identity token) after the client 210 signs on to the HTTP server 205 using the second public key of the second keypair 215-*b*. The access token 230 may enable the client 210 to access resources on the HTTP server 205. Additionally, the access token 230 may include information associated with the first public key of the first keypair 215-*a*. For example, the access token 230 may include a key identifier (ID) of the first public key, a signature of the first public key, or both. The client 210 may compare the key ID and/or the signature of the access token 230 to other messages received from the HTTP server 205. For example, the client 210 may compare the key ID and/or the signature to verify whether the HTTP server 205 is in possession of the first keypair 215-*a* (e.g., and establish trust with the HTTP server 205). Additionally, the access token 230 may be bound to the second public key of the second keypair 215-*b* which was used to sign on the HTTP server 205 via information associated with the second public key embedded in the access token. Exchange of the access token 230 may be associated with the OIDC protocol.

In some examples, the HTTP server 205 and the client 210 may use the exchange of the access token 230 to update a keypair associated with the HTTP server 205. That is, the client 210 may identify a new public key associated with the HTTP server 205 based on the access token 230 including a key ID and/or signature associated with the new public key. Accordingly, the HTTP server 205 may (e.g., periodically and implicitly) indicate a public key of a keypair of the HTTP server 205 to the client 210, even in examples in which a keypair of the HTTP server 205 changes (e.g., based on key rotation).

To share the second public key of the second keypair 215-*b* with the HTTP server 205, the client 210 may utilize token binding. For example, the client 210 may transmit a message 225 to the HTTP server 205 including a DPoP header 220. That is, the client 210 may transmit a DPoP, such as the DPoP header 220 to the HTTP server 205 during an authentication procedure to prove possession of a private key used to obtain the access token 230. The DPoP header may indicate the second public key of the second keypair 215-*b* and a cryptographic signature of the second private key of the second keypair 215-*b*, which may be validated via the second public key. That is, the DPoP header may provide proof-of-possession of the second keypair 215-*b* of the client 210 to the HTTP server 205.

The DPoP header 220 may be used once to prove the possession of the second keypair 215-*b*. Additionally, or alternatively, the DPoP header 220 may include an expiration time, information about a request in the message 225, or both. For example, the DPoP header 220 may include a unique identifier, a timestamp, an expiration time, a URL requested by the client 210, a method the client 210 is requesting to perform, or any combination thereof. Use of the DPoP header 220 may be associated with improved security related to reducing a risk associated with replay attacks. For example, because the DPoP header 220 includes information associated with the request in the message 225, the DPoP header 220 may be identified as having been used, limited to a specific URL and/or method, and/or expire before being replayed.

After exchanging the access token 230 and the DPoP header 220 during sign on and authorization and, thereby, exchanging information associated with the first public key and the second public key, the HTTP server 205 and the client 210 may exchange encrypted messages. For example, the client 210 may transmit a request 235 to the HTTP server 205. The request 235 may include the DPoP header 220. That is, prior to transmitting the request 235, the client 210 may generate a DPoP proof for the request 235, where the DPoP proof includes a signature of the first public key of the first keypair 215-*a* associated with the HTTP server 205. For example, the DPoP proof may include the signature of the first public key and prove possession of the second public key of the second keypair 215-*b* by the client 210.

In some examples, the client 210 may encrypt the request 235. For example, the client 210 may update content preceding one or more sections of the request 235 to include an extension or value indicating that the one or more sections are encrypted. The client 210 may, based on updating the content, encrypt the one or more sections of the request 235 using the first public key of the first keypair 215-*a*. For example, the client 210 may encrypt a body of the request 235, one or more headers of the request 235, or both using the first public key. After encrypting the request 235, the client 210 may transmit the request 235 to the HTTP server 205.

The client 210 may determine to encrypt the request 235 based on the request 235 including sensitive content. For example, the client 210 may identify sensitive content to be included in the request 235 and, accordingly, encrypt the request 235. In some other examples, the client 210 may refrain from encrypting the request 235. For example, the client 210 may refrain from encrypting the request 235 based on identifying an absence of the sensitive content. Refraining from encrypting the request 235 may be associated with reduced processing and/or overhead at the client 210.

After receiving the request 235, the HTTP server 205 may validate the DPoP header 220. For example, the HTTP server 205 may validate the DPoP header 220 using the first private key of the first keypair 215-*a*. Additionally, or alternatively, the HTTP server 205 may validate whether the DPoP header 220 includes an indication of the second public key bound to the access token 230. The HTTP server 205 may reject the request 235 based on failing to validate the DPoP header 220 or respond to the request 235 based on validating the DPoP header 220.

In some examples, the HTTP server 205 may decrypt the request 235. For example, the HTTP server 205 may decrypt the request 235 based on the one or more sections of the request 235 being indicated as encrypted. That is, the HTTP server 205 may decrypt the request 235 based on the content preceding the one or more sections including the extension or value indicating that the one or more sections are encrypted. The HTTP server 205 may decrypt the one or more sections using the first private key of the first keypair 215-*a*.

The HTTP server 205 may transmit a response 240 to the client 210. In some examples, the HTTP server 205 may encrypt the response 240. For example, the HTTP server 205 may update content preceding one or more sections of the response 240 to include an extension or value indicating that the one or more sections are encrypted. The HTTP server 205 may, based on updating the content, encrypt the one or more sections of the response 240 using the second public key of the second keypair 215-*b*. For example, the HTTP server 205 may encrypt a body of the response 240, one or more headers of the response 240, or both using the second public key. After encrypting the request 235, the HTTP server 205 may transmit the response 240 to the HTTP server 205.

The HTTP server 205 may determine to encrypt the response 240 based on the response 240 including sensitive content. For example, the HTTP server 205 may identify sensitive content to be included in the response 240 and, accordingly, encrypt the response 240. In some other examples, the HTTP server 205 may refrain from encrypting the response 240. For example, the client 210 may refrain from encrypting the response 240 based on identifying an absence of the sensitive content. Refraining from encrypting the response 240 may be associated with reduced processing and/or overhead at the HTTP server 205.

Figure 3:
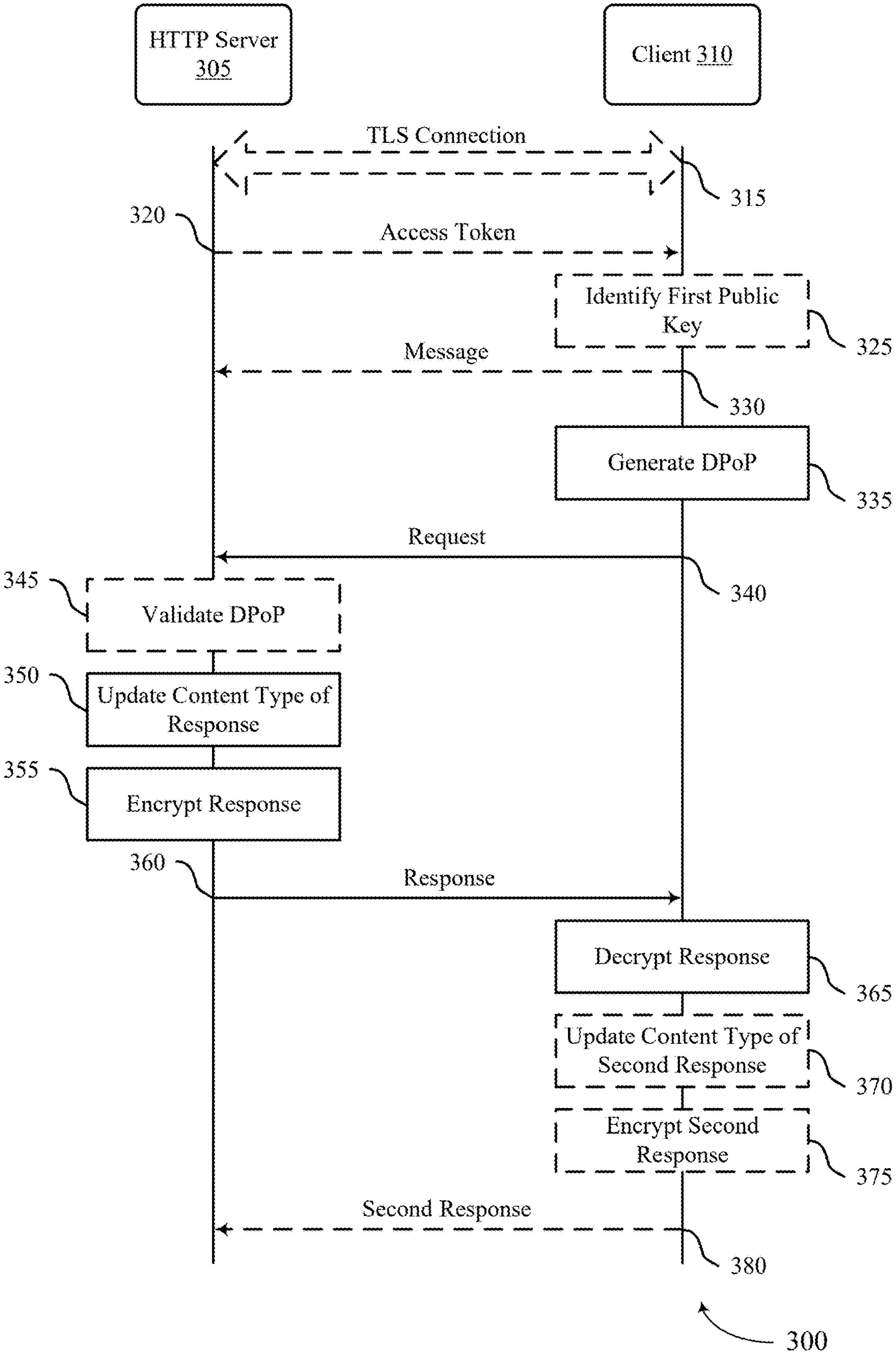
FIG. 3 shows an example of a process flow that supports secure request transport across transport layer connections in accordance with aspects of the present disclosure.

FIG. 3 shows an example of a process flow 300 that supports secure request transport across transport layer connections in accordance with aspects of the present disclosure. In some examples, the process flow 300 may implement aspects of the computing system 100, the computing system 200, or both. The process flow 300 may illustrate operations of an HTTP server 305 and a client 310, which may be examples of corresponding devices as described with reference to FIGS. 1 and 2.

In the following description of the process flow 300, the operations performed at the HTTP server 305 and the client 310 may be performed in different orders or at different times than shown. Additionally, or alternatively, some operations may be omitted from the process flow 300 and other operations may be added to the process flow 300.

At 315, the HTTP server 305 may establish a TLS connection with the client 310. For example, the HTTP server 305 and the client 310 may communicate according to a TLS protocol in which the HTTP server 305 and the client 310 may establish a trusted connection via a handshake procedure. The handshake procedure may include a request by the client 310 to establish a secure connection and identification of the HTTP server 305 via a digital certificate. In some examples, the TLS connection may be untrusted, or a trust associated with the TLS connection may be unknown to the HTTP server 305, to the client 310, or both.

At 320, the HTTP server 305 may transmit an access token to the client 310. The access token may include information associated with a first public key of the HTTP server 305. The first public key may be an example of the first public key of the first keypair 215-*a* as described with reference to FIG. 2. In some examples, the HTTP server 305 may transmit the access token to the client 310 after the client 310 signs on to the HTTP server 305 using a second public key associated with the client 310. The access token may be an example of the access token 230, and the second public key may be an example of the second public key of the second keypair 215-*b* as described with reference to FIG. 2. The access token may be bound to an identity of the client 310 via inclusion of information associated with the second public key (e.g., used to sign on to the HTTP server 305). For example, the access token may be bound to the second public key supplied by the client 310 such that the HTTP server 305 may reject requests from the client 310 which are not signed by the client 310 in possession of the associated second public key.

In some examples, the access token may be an example of a JSON Web Token (JWT). For example, the access token may be represented via the JWT, where the JWT includes a signature of the first public key associated with the first keypair of the HTTP server 305. Additionally, or alternatively, the access token may be an opaque string value.

At 325, the client 310 may identify the first public key. For example, the client 310 may identify the first public key of a first keypair associated with the HTTP server 305 based on receiving the access token at 320 including the information associated with the first public key.

At 330, the client 310 may transmit a message to the HTTP server 305. The message may be configured to support token binding, in which a token associated with the client 310 is bound to a client device. For example, the message may include a DPoP header indicative of the second public key of the second keypair of the client 310. The DPoP header may be an example of the DPoP header 220 as described with reference to FIG. 2. The client 310 may transmit the message including the DPoP header during an authentication procedure to prove possession of the second private key used to obtain the access token at 320. The DPoP header may indicate the second public key of the second keypair and a cryptographic signature of the second private key of the second keypair, which may be validated via the second public key. That is, the DPoP header may provide proof-of-possession of the second keypair of the client 310 to the HTTP server 305.

At 335, the client 310 may generate a DPoP. For example, the client 310 may generate the DPoP including a signature of the first public key of the first keypair associated with the HTTP server 305, where the HTTP server 305 has the first private key of the first keypair. In some examples, the DPoP may include (e.g., in addition to the signature) a uniform resource identifier (URI), a HTTP, a timestamp, an expiration time, a unique identifier, or any combination thereof associated with a request.

At 340, the client 310 may transmit the request to the HTTP server 305. For example, the client 310 may transmit the request including the DPoP to the HTTP server 305. In some examples, the client 310 may encrypt the request (e.g., prior to transmission).

At 345, the HTTP server 305 may validate the DPoP. For example, the HTTP server 305 may validate the DPoP using the first private key of the first keypair. Additionally, or alternatively, the HTTP server 305 may validate whether the DPoP includes an indication of the second public key bound to the access token transmitted at 320.

In some examples, such as examples in which the request is encrypted, the HTTP server 305 may decrypt the request after validating the DPoP. For example, the request may include an indication that one or more sections of the request are encrypted using the first public key of the first keypair of the HTTP server 205. Based on the indication, the HTTP server 305 may decrypt the one or more sections using the first private key of the first keypair.

At 350, the HTTP server 305 may update a content type of a response. For example, the HTTP server 305 may determine to update the content type of the response to include one or more sections encrypted using the second public key of the second keypair of the client 310 based on identifying sensitive content to be included in the response. The HTTP server 305 may update the content type of the response to include an indication that one or more sections of the response are encrypted using the second public key of the second keypair associated with the client 310 having the second private key of the second keypair based on receiving the request at 340 and/or based on validating the DPoP at 345. In examples in which the request is encrypted, the HTTP server 305 may update the content type of the response based on decrypting the request.

At 355, the HTTP server 305 may encrypt the response. For example, the HTTP server 305 may encrypt, in accordance with the indication, the one or more sections of the response using the second public key of the second keypair associated with the client 310. In some examples, the encrypting may include encrypting a body of the response, one or more headers of the response, or both using the second public key.

At 360, the HTTP server 305 may transmit a response to the client 310. For example, the HTTP server 305 may transmit the response including the one or more encrypted sections based on receiving the request at 340 comprising the DPoP. In other words, the client 310 may receive the response including the indication that the one or more sections of the response are encrypted using the second public key of the second keypair of the client 310.

At 365, the client 310 may decrypt the response. For example, the client 310 may decrypt the response using the second private key of the second keypair of the client 310. In other words, the client 310 may decrypt the one or more sections of the response encrypted using the second public key of the second keypair (e.g., based on the indication).

In some examples, the client 310 may transmit a second response to the response received at 360. In such examples, the client 310 may encrypt the second response. For example, at 370, the client 310 may update a content type of the second response. That is, the client 310 may update a content type of the second response to include an indication that one or more sections of the second response are encrypted using the first public key of the first keypair associated with the HTTP server 305.

At 375, the client 310 may encrypt the second response. For example, the client 310 may encrypt the one or more sections of the second response using the first public key of the first keypair associated with the HTTP server 305. After encrypting the second response, at 380, the client 310 may transmit the second response.

Figure 4:
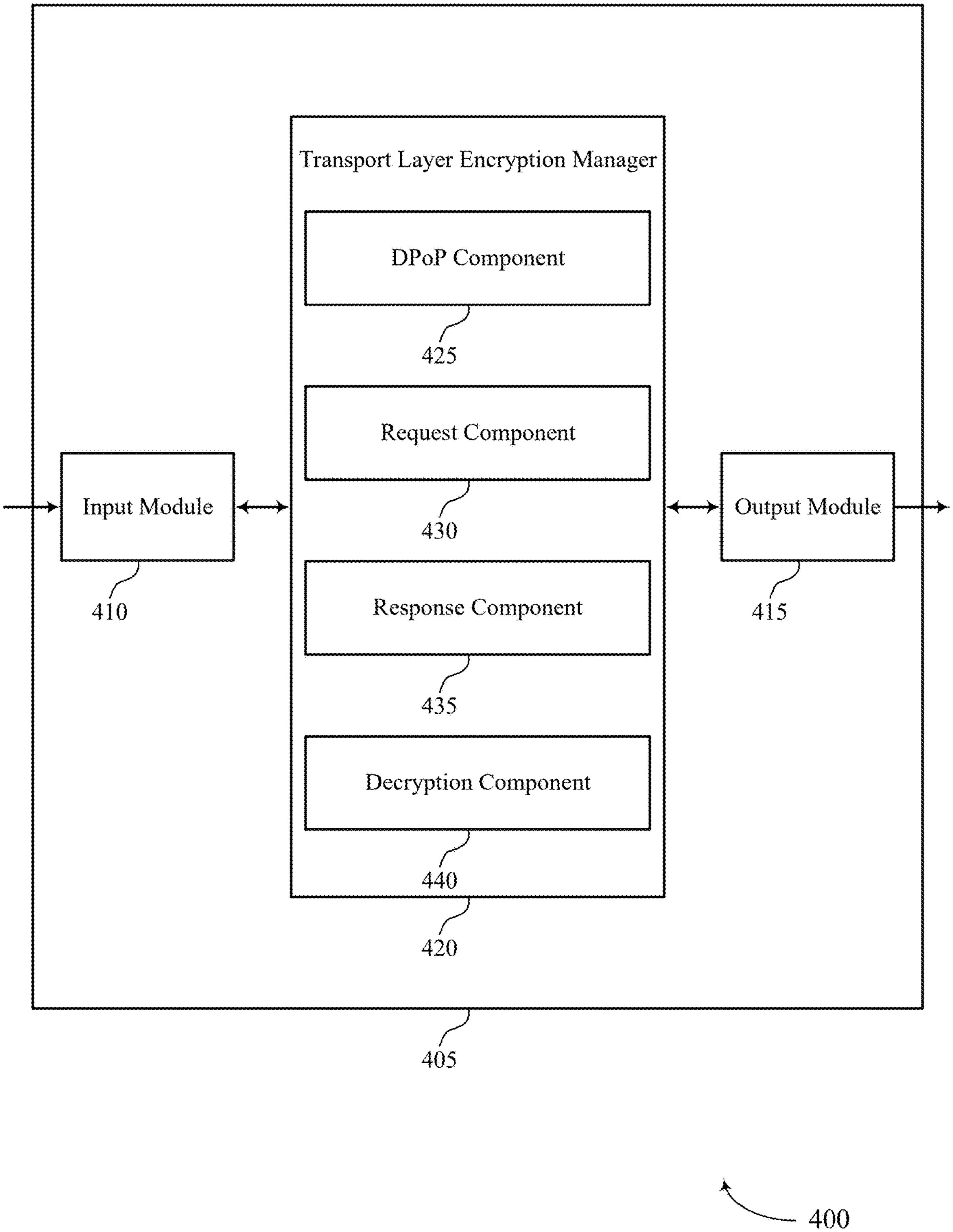
FIG. 4 shows a block diagram of an apparatus that supports secure request transport across transport layer connections in accordance with aspects of the present disclosure.

FIG. 4 shows a block diagram 400 of a device 405 that supports secure request transport across transport layer connections in accordance with aspects of the present disclosure. The device 405 may include an input module 410, an output module 415, and a transport layer encryption manager 420. The device 405, or one or more components of the device 405 (e.g., the input module 410, the output module 415, the transport layer encryption manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the transport layer encryption manager 420 to support secure request transport across transport layer connections. In some cases, the input module 410 may be a component of an input/output (I/O) controller 610 as described with reference to FIG. 6.

The output module 415 may manage output signals for the device 405. For example, the output module 415 may receive signals from other components of the device 405, such as the transport layer encryption manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the transport layer encryption manager 420 may include a DPoP component 425, a request component 430, a response component 435, a decryption component 440, or any combination thereof. In some examples, the transport layer encryption manager 420, or various components thereof, may be configured to perform various operations (e.g., receiving, monitoring, transmitting) using or otherwise in cooperation with the input module 410, the output module 415, or both. For example, the transport layer encryption manager 420 may receive information from the input module 410, send information to the output module 415, or be integrated in combination with the input module 410, the output module 415, or both to receive information, transmit information, or perform various other operations as described herein.

The transport layer encryption manager 420 may support message encryption between a HTTP server and a client device in accordance with examples as disclosed herein. The DPoP component 425 may be configured to support generating, by the client device, a DPoP including a signature of a first public key of a first keypair associated with the HTTP server, where the HTTP server has a first private key of the first keypair. The request component 430 may be configured to support transmitting, to the HTTP server, a request including the demonstration of proof-of possession of the client device. The response component 435 may be configured to support receiving a response from the HTTP server based on transmitting the request, the response including an indication that one or more sections of the response are encrypted using a second public key of a second keypair of the client device. The decryption component 440 may be configured to support decrypting, based on the response including the indication, the response using a second private key of the second keypair of the client device.

Figure 5:
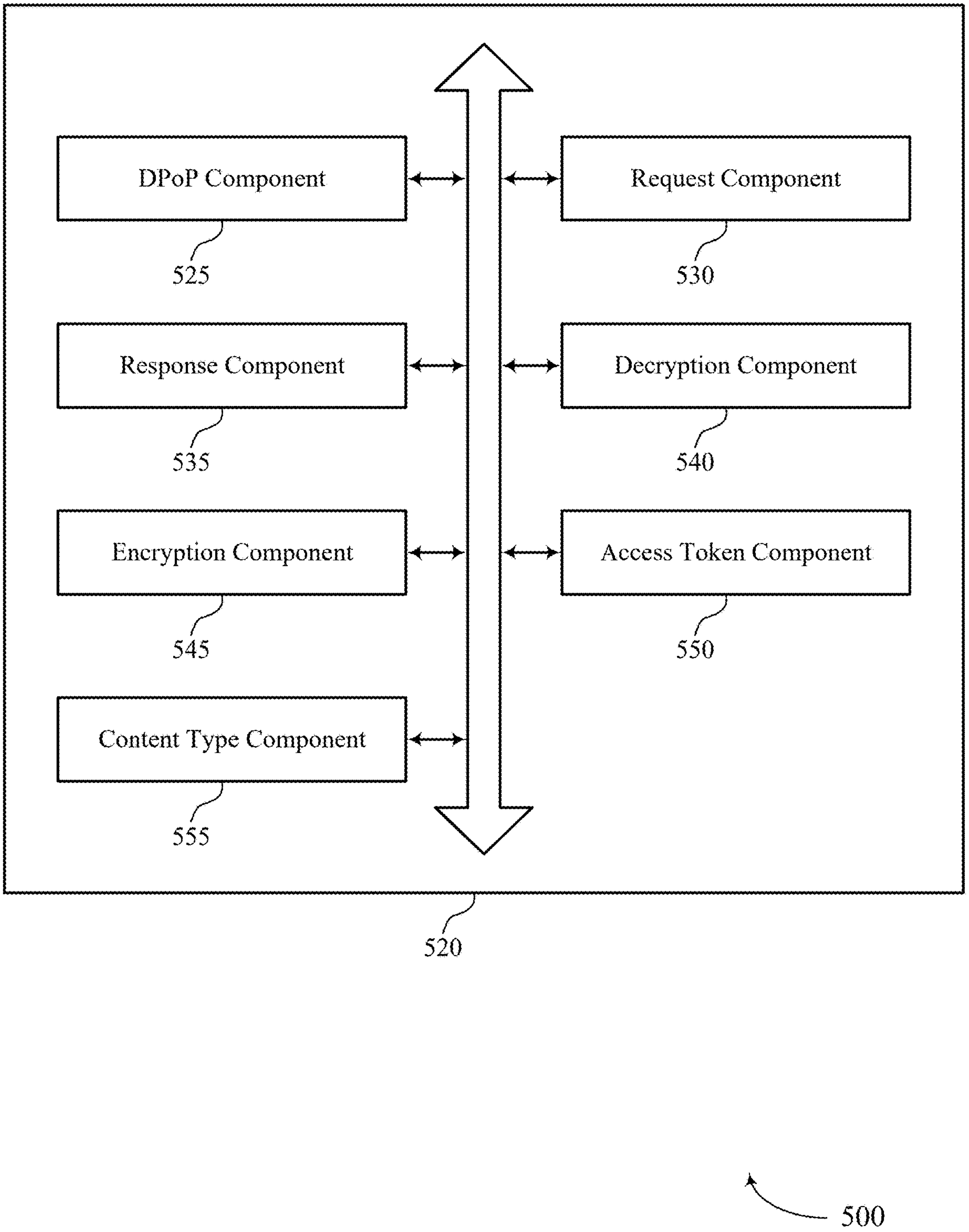
FIG. 5 shows a block diagram of a transport layer encryption manager that supports secure request transport across transport layer connections in accordance with aspects of the present disclosure.

FIG. 5 shows a block diagram 500 of a transport layer encryption manager 520 that supports secure request transport across transport layer connections in accordance with aspects of the present disclosure. The transport layer encryption manager 520 may be an example of aspects of a transport layer encryption manager or a transport layer encryption manager 420, or both, as described herein. The transport layer encryption manager 520, or various components thereof, may be an example of means for performing various aspects of secure request transport across transport layer connections as described herein. For example, the transport layer encryption manager 520 may include a DPoP component 525, a request component 530, a response component 535, a decryption component 540, an encryption component 545, an access token component 550, a content type component 555, or any combination thereof. Each of these components, or components of subcomponents thereof (e.g., one or more processors, one or more memories), may communicate, directly or indirectly, with one another (e.g., via one or more buses).

The transport layer encryption manager 520 may support message encryption between a HTTP server and a client device in accordance with examples as disclosed herein. The DPoP component 525 may be configured to support generating, by the client device, a DPoP including a signature of a first public key of a first keypair associated with the HTTP server, where the HTTP server has a first private key of the first keypair. The request component 530 may be configured to support transmitting, to the HTTP server, a request including the demonstration of proof-of possession of the client device. The response component 535 may be configured to support receiving a response from the HTTP server based on transmitting the request, the response including an indication that one or more sections of the response are encrypted using a second public key of a second keypair of the client device. The decryption component 540 may be configured to support decrypting, based on the response including the indication, the response using a second private key of the second keypair of the client device.

In some examples, the encryption component 545 may be configured to support encrypting one or more second sections of a second response to the response using the first public key of the first keypair associated with the HTTP server. In some examples, the response component 535 may be configured to support transmitting the second response to the response, where the second response includes a second indication that one or more second sections of the second response are encrypted using the first public key of the first keypair associated with the HTTP server.

In some examples, the content type component 555 may be configured to support updating a content type of the request to include the second indication based on generating the DPoP.

In some examples, the encryption component 545 may be configured to support encrypting one or more second sections of the request using the first public key of the first keypair associated with the HTTP server, wherein the encrypting comprises encrypting a body of the request, one or more headers of the request, or both using the first public key.

In some examples, the DPoP component 525 may be configured to support transmitting, to the HTTP server prior to transmission of the request, a message including a DPoP header, the DPoP header indicative of the second public key of the second keypair of the client device having the second private key of the second keypair.

In some examples, the access token component 550 may be configured to support receiving, from the HTTP server and based on sharing the second public key of the second keypair of the client device, an access token bound to an identity of the client device via inclusion of information associated with the second public key.

In some examples, the access token component 550 may be configured to support receiving, from the HTTP server, an access token including information associated with the first public key of the HTTP server. In some examples, the access token includes a JWT. In some examples, the information associated with the first public key includes a signature of the JWT. In some examples, the access token component 550 may be configured to support identifying the first public key of the HTTP server based on receiving the access token.

In some examples, to support receiving the response, the response component 535 may be configured to support receiving the response from the HTTP server based on a validation of the DPoP via the first private key of the first keypair of the HTTP server. In some examples, transmitting the request, receiving the response, or both are performed via an untrusted TLS connection.

In some examples, the one or more sections of the response are indicated as encrypted via an extension or value included in content of the response preceding the one or more sections.

In some examples, the DPoP further includes, in addition to the signature of the first public key, a URI, a HTTP, a timestamp, an expiration time, a unique identifier, or any combination thereof associated with the request.

Figure 6:
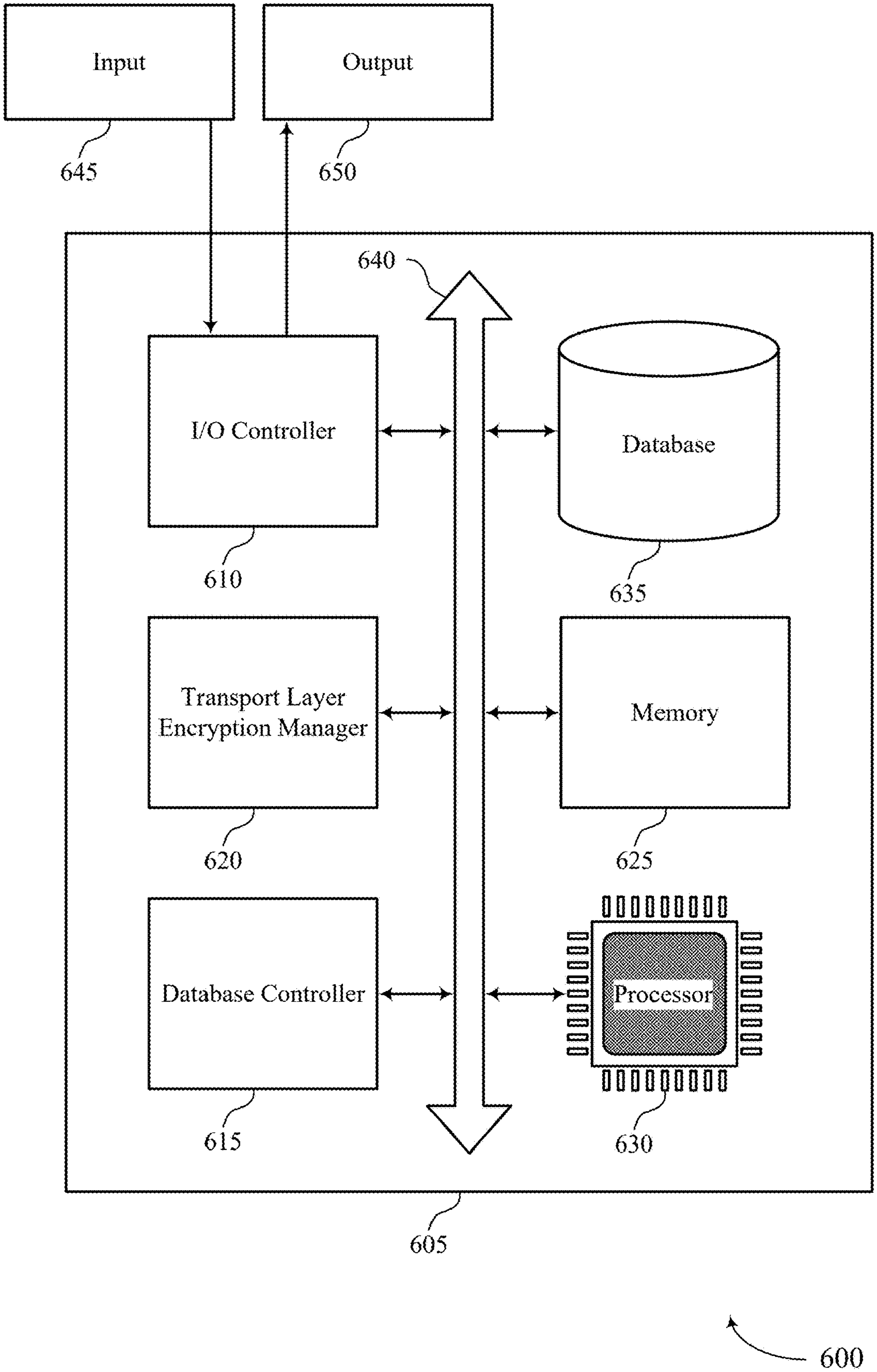
FIG. 6 shows a diagram of a system including a device that supports secure request transport across transport layer connections in accordance with aspects of the present disclosure.

FIG. 6 shows a diagram of a system 600 including a device 605 that supports secure request transport across transport layer connections in accordance with aspects of the present disclosure. The device 605 may be an example of or include components of a device 405 as described herein. The device 605 may include components for bi-directional voice and data communications including components for transmitting and receiving communications, such as a transport layer encryption manager 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting secure request transport across transport layer connections). The processor 630 may be an example of a single processor or multiple processors. For example, the device 605 may include one or more processors 630.

The transport layer encryption manager 620 may support message encryption between a HTTP server and a client device in accordance with examples as disclosed herein. For example, the transport layer encryption manager 620 may be configured to support generating, by the client device, a DPoP including a signature of a first public key of a first keypair associated with the HTTP server, where the HTTP server has a first private key of the first keypair. The transport layer encryption manager 620 may be configured to support transmitting, to the HTTP server, a request including the demonstration of proof-of possession of the client device. The transport layer encryption manager 620 may be configured to support receiving a response from the HTTP server based on transmitting the request, the response including an indication that one or more sections of the response are encrypted using a second public key of a second keypair of the client device. The transport layer encryption manager 620 may be configured to support decrypting, based at least in part on the response including the indication, the response using a second private key of the second keypair of the client device.

By including or configuring the transport layer encryption manager 620 in accordance with examples as described herein, the device 605 may support techniques for improved security, improved user experience related to reduced processing, and reduced overhead.

Figure 7:
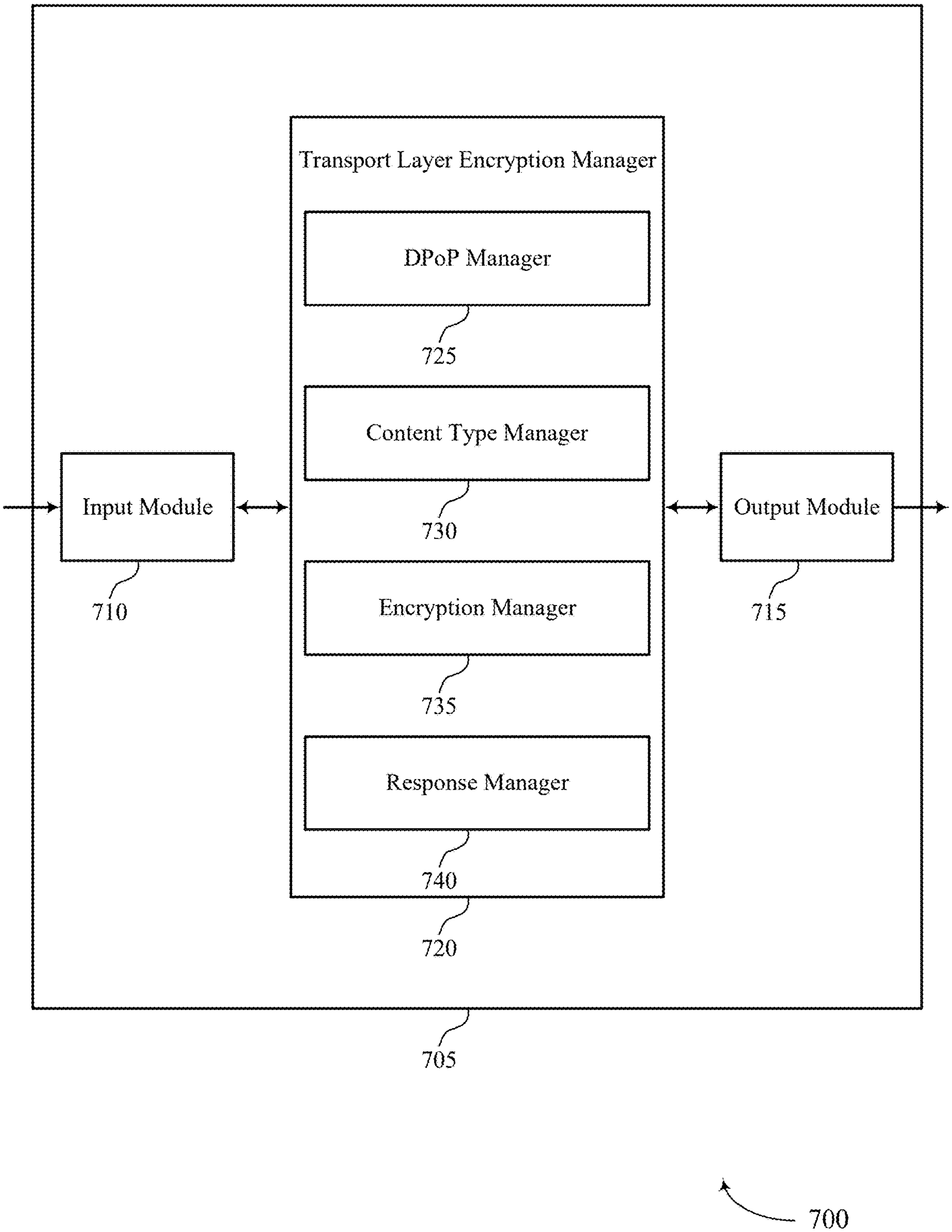
FIG. 7 shows a block diagram of an apparatus that supports secure request transport across transport layer connections in accordance with aspects of the present disclosure.

FIG. 7 shows a block diagram 700 of a device 705 that supports secure request transport across transport layer connections in accordance with aspects of the present disclosure. The device 705 may include an input module 710, an output module 715, and a transport layer encryption manager 720. The device 705, or one or more components of the device 705 (e.g., the input module 710, the output module 715, the transport layer encryption manager 720), may include at least one processor, which may be coupled with at least one memory, to support the described techniques. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the transport layer encryption manager 720 to support secure request transport across transport layer connections. In some cases, the input module 710 may be a component of an input/output (I/O) controller 910 as described with reference to FIG. 9.

The output module 715 may manage output signals for the device 705. For example, the output module 715 may receive signals from other components of the device 705, such as the transport layer encryption manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the transport layer encryption manager 720 may include a DPoP manager 725, a content type manager 730, an encryption manager 735, a response manager 740, or any combination thereof. In some examples, the transport layer encryption manager 720, or various components thereof, may be configured to perform various operations (e.g., receiving, monitoring, transmitting) using or otherwise in cooperation with the input module 710, the output module 715, or both. For example, the transport layer encryption manager 720 may receive information from the input module 710, send information to the output module 715, or be integrated in combination with the input module 710, the output module 715, or both to receive information, transmit information, or perform various other operations as described herein.

The transport layer encryption manager 720 may support message encryption between a HTTP server and a client device in accordance with examples as disclosed herein. The DPoP manager 725 may be configured to support receiving, from the client device, a request including a DPoP of the client device signed using a first public key of a first keypair associated with the HTTP server, where the HTTP server has a first private key of the first keypair. The content type manager 730 may be configured to support updating a content type of a response to include an indication that one or more sections of the response are encrypted using a second public key of a second keypair associated with the client device having a second private key of the second keypair based on receiving the request. The encryption manager 735 may be configured to support encrypting, in accordance with the indication, the one or more sections of the response using the second public key of the second keypair associated with the client device. The response manager 740 may be configured to support transmitting, to the client device, the response including the one or more encrypted sections based on receiving the request including the DPoP.

Figure 8:
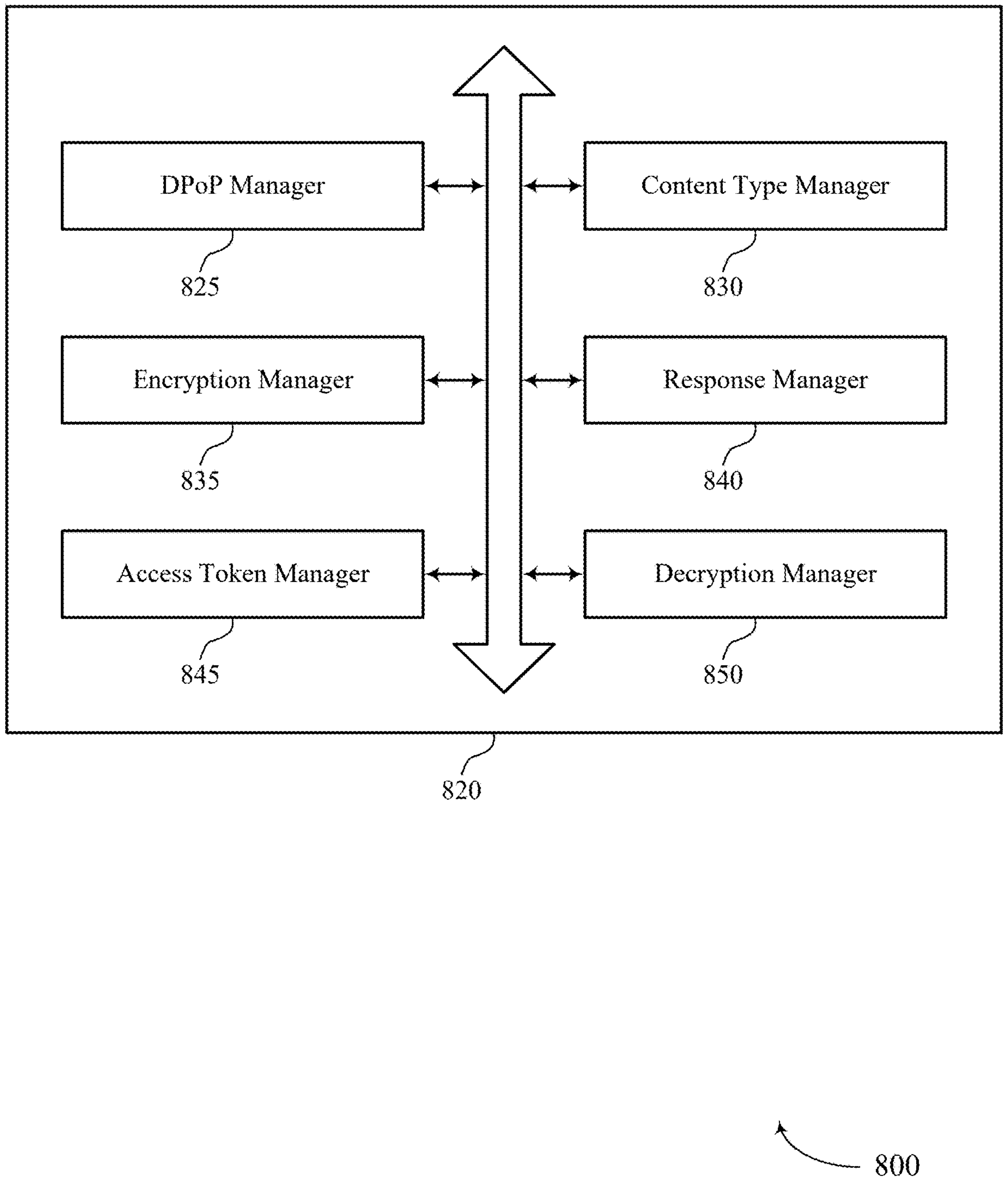
FIG. 8 shows a block diagram of a transport layer encryption manager that supports secure request transport across transport layer connections in accordance with aspects of the present disclosure.

FIG. 8 shows a block diagram 800 of a transport layer encryption manager 820 that supports secure request transport across transport layer connections in accordance with aspects of the present disclosure. The transport layer encryption manager 820 may be an example of aspects of a transport layer encryption manager or a transport layer encryption manager 720, or both, as described herein. The transport layer encryption manager 820, or various components thereof, may be an example of means for performing various aspects of secure request transport across transport layer connections as described herein. For example, the transport layer encryption manager 820 may include a DPoP manager 825, a content type manager 830, an encryption manager 835, a response manager 840, an access token manager 845, a decryption manager 850, or any combination thereof. Each of these components, or components of subcomponents thereof (e.g., one or more processors, one or more memories), may communicate, directly or indirectly, with one another (e.g., via one or more buses).

The transport layer encryption manager 820 may support message encryption between a HTTP server and a client device in accordance with examples as disclosed herein. The DPoP manager 825 may be configured to support receiving, from the client device, a request including a DPoP of the client device signed using a first public key of a first keypair associated with the HTTP server, where the HTTP server has a first private key of the first keypair. The content type manager 830 may be configured to support updating a content type of a response to include an indication that one or more sections of the response are encrypted using a second public key of a second keypair associated with the client device having a second private key of the second keypair based on receiving the request. The encryption manager 835 may be configured to support encrypting, in accordance with the indication, the one or more sections of the response using the second public key of the second keypair associated with the client device. The response manager 840 may be configured to support transmitting, to the client device, the response including the one or more encrypted sections based on receiving the request including the DPoP.

In some examples, to support encrypting the one or more sections, the encryption manager 835 may be configured to support encrypting a body of the response, one or more headers of the response, or both using the second public key.

In some examples, the DPoP manager 825 may be configured to support receiving, from the client device prior to receipt of the request, a message including a DPoP header, the DPoP header indicative of the second public key of the second keypair of the client device having the second private key of the second keypair.

In some examples, the access token manager 845 may be configured to support transmitting, to the client device and based on receiving the second public key of the second keypair of the client device, an access token bound to an identity of the client device via inclusion of information associated with the second public key.

In some examples, the access token manager 845 may be configured to support transmitting, to the client device, an access token including information associated with the first public key of the HTTP server, where receiving the request including the DPoP of the client device signed using the first public key is based on transmitting the access token.

In some examples, the access token includes a JWT. In some examples, the information associated with the first public key includes a signature of the JWT.

In some examples, the response manager 840 may be configured to support validating the DPoP using the first private key of the first keypair of the HTTP server, where transmitting the response is based on validating the DPoP.

In some examples, the decryption manager 850 may be configured to support decrypting, based on the request including a second indication that one or more second sections of the request are encrypted using the first public key of the first keypair associated with the HTTP server, the one or more second sections of the request using the first private key of the first keypair of the HTTP server, where transmitting the response is based on decrypting the one or more second sections of the request.

In some examples, encrypting the one or more sections is based on a second indication of the request, an encryption of the request, or both.

In some examples, receiving the request, transmitting the response, or both are performed via an untrusted TLS connection.

In some examples, the one or more sections of the response are indicated as encrypted via an extension or value included in content of the response preceding the one or more sections.

In some examples, the DPoP further includes, in addition to a signature of the first public key, a URI, a HTTP, a timestamp, an expiration time, a unique identifier, or any combination thereof associated with the request.

Figure 9:
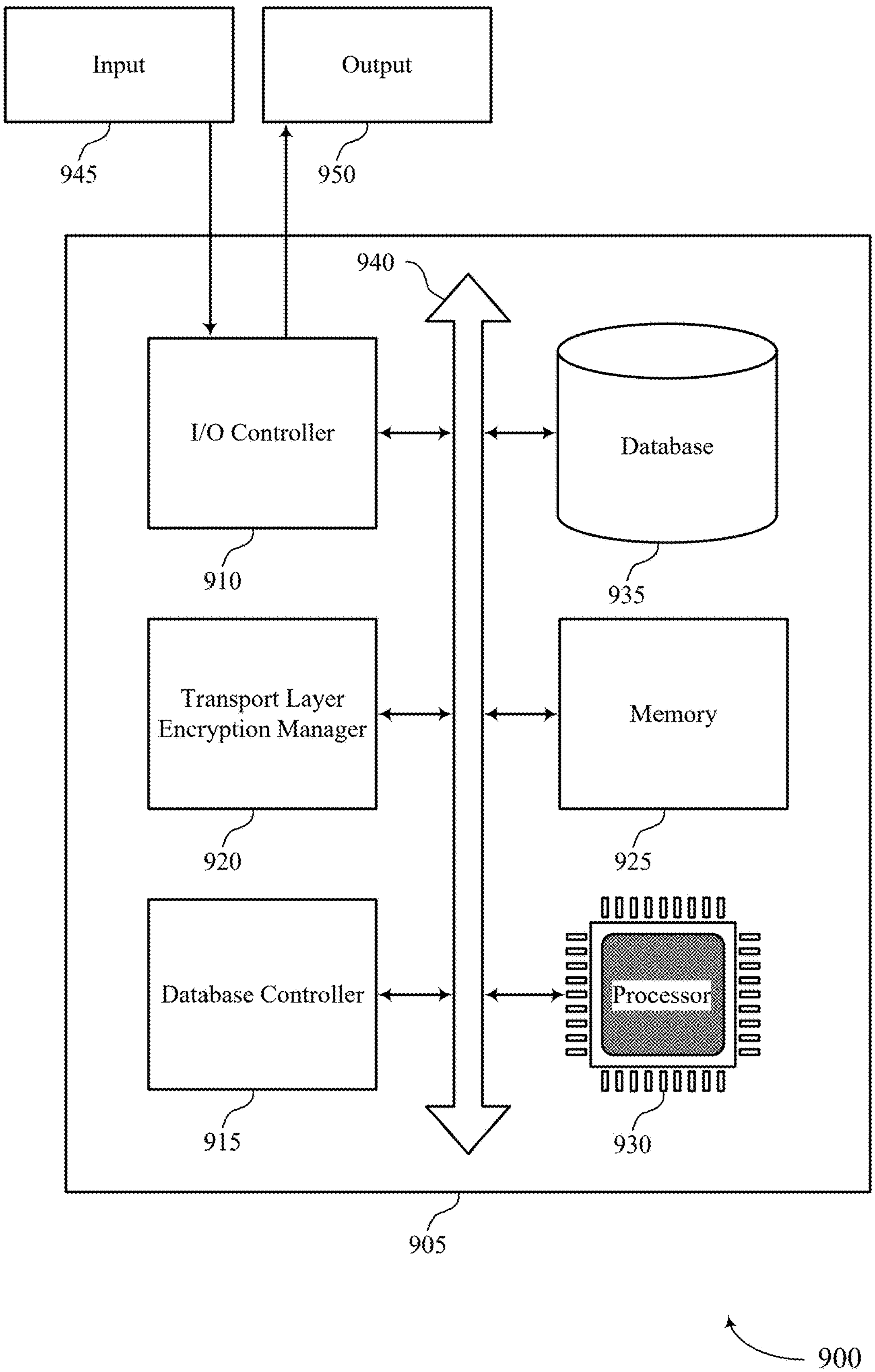
FIG. 9 shows a diagram of a system including a device that supports secure request transport across transport layer connections in accordance with aspects of the present disclosure.

FIG. 9 shows a diagram of a system 900 including a device 905 that supports secure request transport across transport layer connections in accordance with aspects of the present disclosure. The device 905 may be an example of or include components of a device 705 as described herein. The device 905 may include components for bi-directional voice and data communications including components for transmitting and receiving communications, such as a transport layer encryption manager 920, an I/O controller, such as an I/O controller 910, a database controller 915, at least one memory 925, at least one processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause at least one processor 930 to perform various functions described herein. In some cases, the memory 925 may contain, among other things, a basic I/O system (BIOS) which may control basic hardware or software operation such as the interaction with peripheral components or devices. The memory 925 may be an example of a single memory or multiple memories. For example, the device 905 may include one or more memories 925.

The processor 930 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in at least one memory 925 to perform various functions (e.g., functions or tasks supporting secure request transport across transport layer connections). The processor 930 may be an example of a single processor or multiple processors. For example, the device 905 may include one or more processors 930.

The transport layer encryption manager 920 may support message encryption between a HTTP server and a client device in accordance with examples as disclosed herein. For example, the transport layer encryption manager 920 may be configured to support receiving, from the client device, a request including a DPoP of the client device signed using a first public key of a first keypair associated with the HTTP server, where the HTTP server has a first private key of the first keypair. The transport layer encryption manager 920 may be configured to support updating a content type of a response to include an indication that one or more sections of the response are encrypted using a second public key of a second keypair associated with the client device having a second private key of the second keypair based on receiving the request. The transport layer encryption manager 920 may be configured to support encrypting, in accordance with the indication, the one or more sections of the response using the second public key of the second keypair associated with the client device. The transport layer encryption manager 920 may be configured to support transmitting, to the client device, the response including the one or more encrypted sections based on receiving the request including the DPoP.

By including or configuring the transport layer encryption manager 920 in accordance with examples as described herein, the device 905 may support techniques for improved security, improved user experience related to reduced processing, and reduced overhead.

Figure 10:
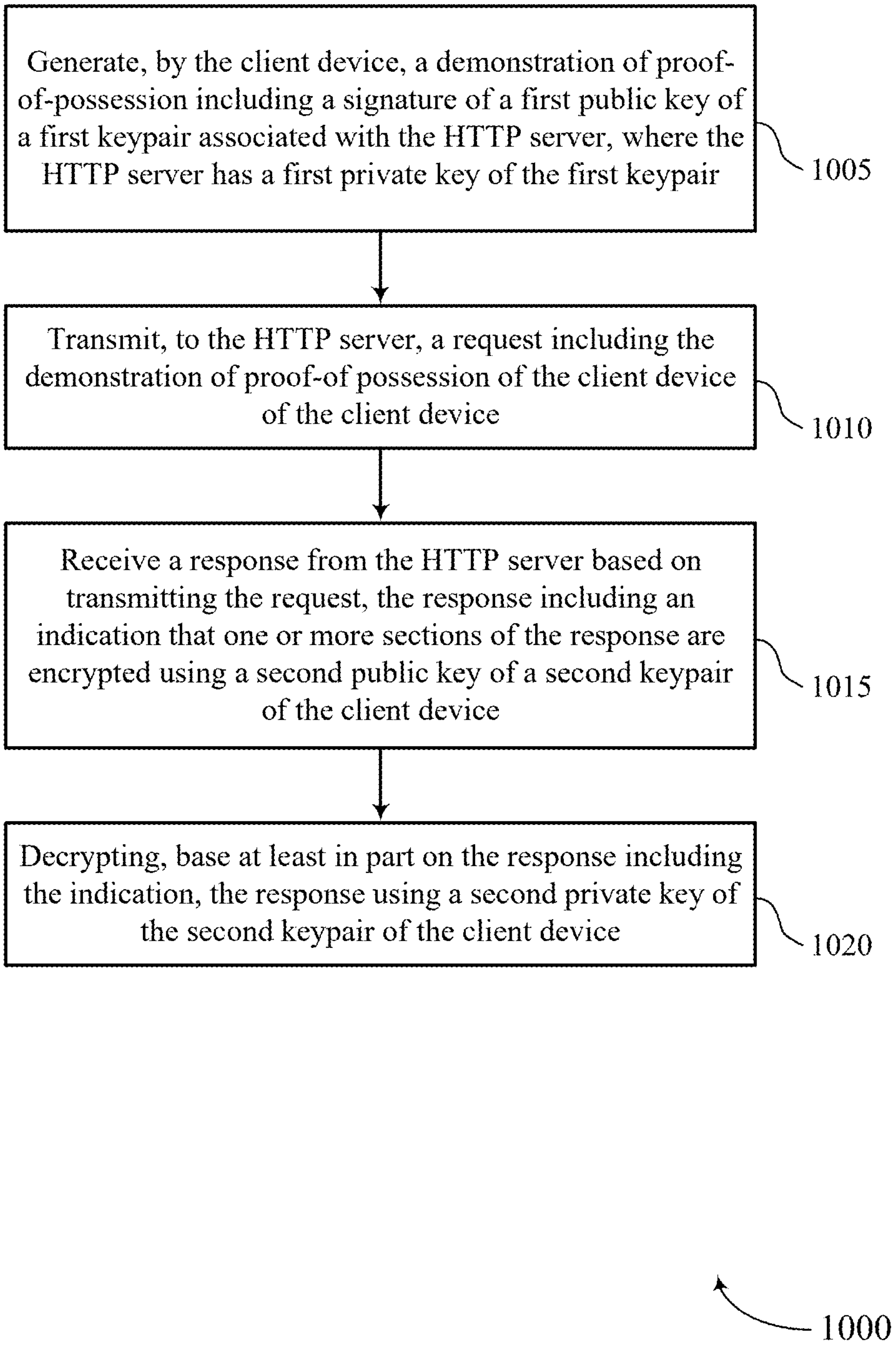
FIGS. 10 through 13 show flowcharts illustrating methods that support secure request transport across transport layer connections in accordance with aspects of the present disclosure.

FIG. 10 shows a flowchart illustrating a method 1000 that supports secure request transport across transport layer connections in accordance with aspects of the present disclosure. The operations of the method 1000 may be implemented by a client or its components as described herein. For example, the operations of the method 1000 may be performed by a client as described with reference to FIGS. 1 through 6. In some examples, a client may execute a set of instructions to control the functional elements of the client to perform the described functions. Additionally, or alternatively, the client may perform aspects of the described functions using special-purpose hardware.

At 1005, the method may include generating, by the client device, a DPoP including a signature of a first public key of a first keypair associated with the HTTP server, where the HTTP server has a first private key of the first keypair. The operations of 1005 may be performed in accordance with examples as disclosed herein. In some examples, aspects of the operations of 1005 may be performed by a DPoP component 525 as described with reference to FIG. 5.

At 1010, the method may include transmitting, to the HTTP server, a request including the demonstration of proof-of possession of the client device. The operations of 1010 may be performed in accordance with examples as disclosed herein. In some examples, aspects of the operations of 1010 may be performed by a request component 530 as described with reference to FIG. 5.

At 1015, the method may include receiving a response from the HTTP server based on transmitting the request, the response including an indication that one or more sections of the response are encrypted using a second public key of a second keypair of the client device. The operations of 1015 may be performed in accordance with examples as disclosed herein. In some examples, aspects of the operations of 1015 may be performed by a response component 535 as described with reference to FIG. 5.

At 1020, the method may include decrypting, based on the response including the indication, the response using a second private key of the second keypair of the client device. The operations of 1020 may be performed in accordance with examples as disclosed herein. In some examples, aspects of the operations of 1020 may be performed by a decryption component 540 as described with reference to FIG. 5.

Figure 11:
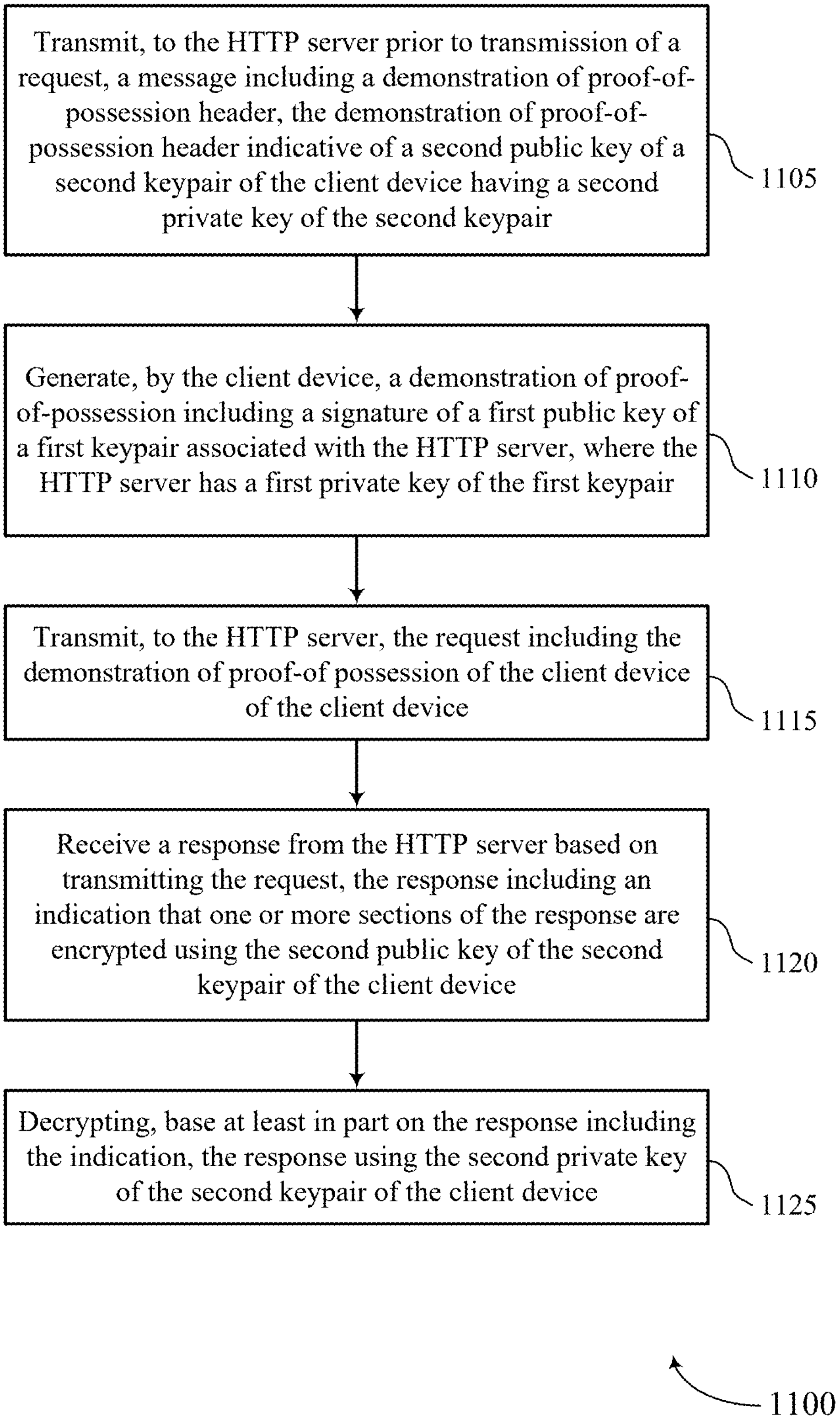

FIG. 11 shows a flowchart illustrating a method 1100 that supports secure request transport across transport layer connections in accordance with aspects of the present disclosure. The operations of the method 1100 may be implemented by a client or its components as described herein. For example, the operations of the method 1100 may be performed by a client as described with reference to FIGS. 1 through 6. In some examples, a client may execute a set of instructions to control the functional elements of the client to perform the described functions. Additionally, or alternatively, the client may perform aspects of the described functions using special-purpose hardware.

At 1105, the method may include transmitting, to the HTTP server prior to transmission of the request, a message including a DPoP header, the DPoP header indicative of the second public key of the second keypair of the client device having the second private key of the second keypair. The operations of 1105 may be performed in accordance with examples as disclosed herein. In some examples, aspects of the operations of 1105 may be performed by a DPoP component 525 as described with reference to FIG. 5.

At 1110, the method may include generating, by the client device, a DPoP including a signature of a first public key of a first keypair associated with the HTTP server, where the HTTP server has a first private key of the first keypair. The operations of 1110 may be performed in accordance with examples as disclosed herein. In some examples, aspects of the operations of 1110 may be performed by a DPoP component 525 as described with reference to FIG. 5.

At 1115, the method may include transmitting, to the HTTP server, a request including the demonstration of proof-of possession of the client device. The operations of 1115 may be performed in accordance with examples as disclosed herein. In some examples, aspects of the operations of 1115 may be performed by a request component 530 as described with reference to FIG. 5.

At 1120, the method may include receiving a response from the HTTP server based on transmitting the request, the response including an indication that one or more sections of the response are encrypted using a second public key of a second keypair of the client device. The operations of 1120 may be performed in accordance with examples as disclosed herein. In some examples, aspects of the operations of 1120 may be performed by a response component 535 as described with reference to FIG. 5.

At 1125, the method may include decrypting, based on the response including the indication, the response using a second private key of the second keypair of the client device. The operations of 1125 may be performed in accordance with examples as disclosed herein. In some examples, aspects of the operations of 1125 may be performed by a decryption component 540 as described with reference to FIG. 5.

Figure 12:
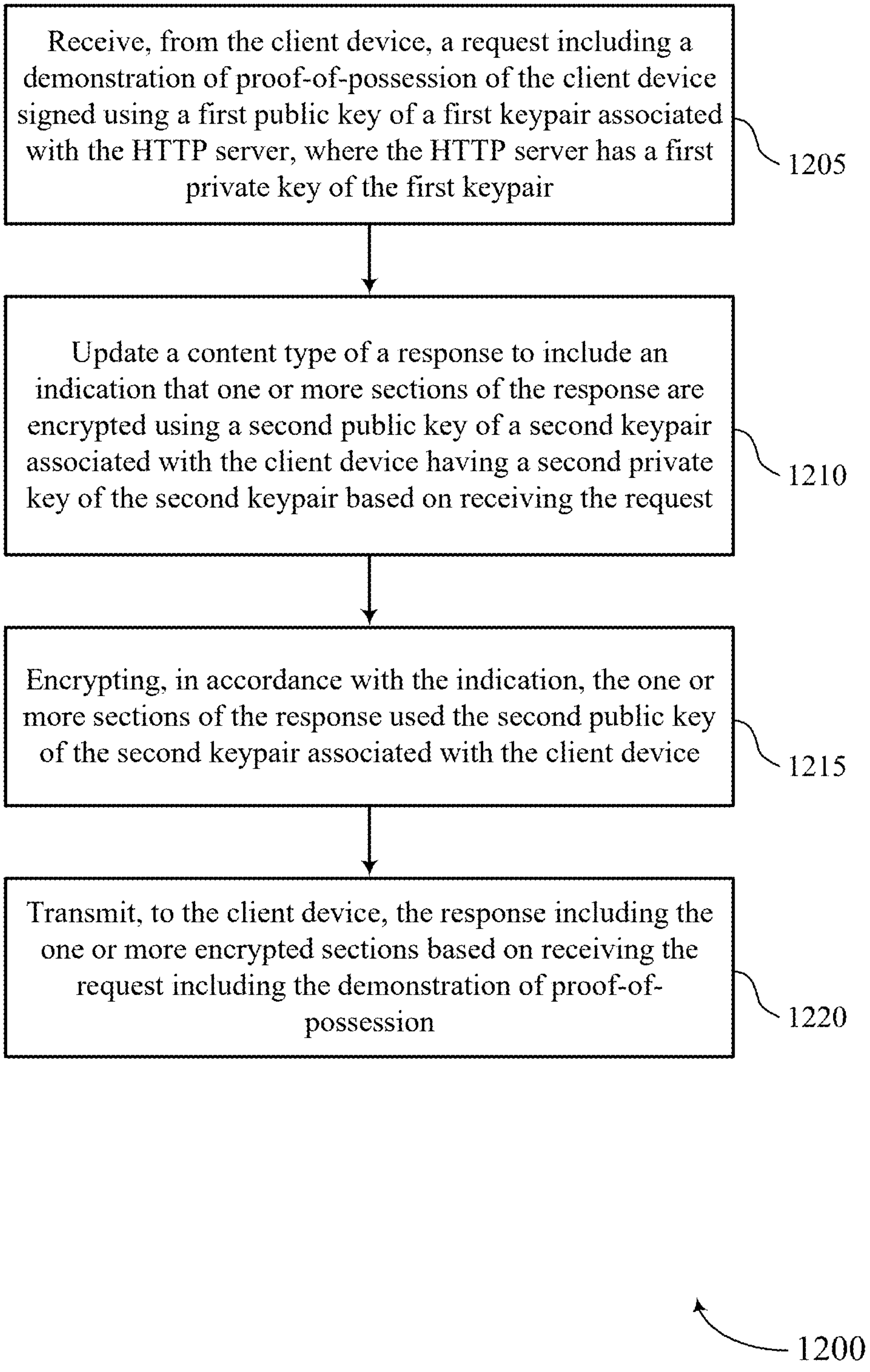

FIG. 12 shows a flowchart illustrating a method 1200 that supports secure request transport across transport layer connections in accordance with aspects of the present disclosure. The operations of the method 1200 may be implemented by an HTTP server or its components as described herein. For example, the operations of the method 1200 may be performed by an HTTP server as described with reference to FIGS. 1 through 3 and 7 through 9. In some examples, an HTTP server may execute a set of instructions to control the functional elements of the HTTP server to perform the described functions. Additionally, or alternatively, the HTTP server may perform aspects of the described functions using special-purpose hardware.

At 1205, the method may include receiving, from the client device, a request including a DPoP of the client device signed using a first public key of a first keypair associated with the HTTP server, where the HTTP server has a first private key of the first keypair. The operations of 1205 may be performed in accordance with examples as disclosed herein. In some examples, aspects of the operations of 1205 may be performed by a DPoP manager 825 as described with reference to FIG. 8.

At 1210, the method may include updating a content type of a response to include an indication that one or more sections of the response are encrypted using a second public key of a second keypair associated with the client device having a second private key of the second keypair based on receiving the request. The operations of 1210 may be performed in accordance with examples as disclosed herein. In some examples, aspects of the operations of 1210 may be performed by a content type manager 830 as described with reference to FIG. 8.

At 1215, the method may include encrypting, in accordance with the indication, the one or more sections of the response using the second public key of the second keypair associated with the client device. The operations of 1215 may be performed in accordance with examples as disclosed herein. In some examples, aspects of the operations of 1215 may be performed by an encryption manager 835 as described with reference to FIG. 8.

At 1220, the method may include transmitting, to the client device, the response including the one or more encrypted sections based on receiving the request including the DPoP. The operations of 1220 may be performed in accordance with examples as disclosed herein. In some examples, aspects of the operations of 1220 may be performed by a response manager 840 as described with reference to FIG. 8.

Figure 13:
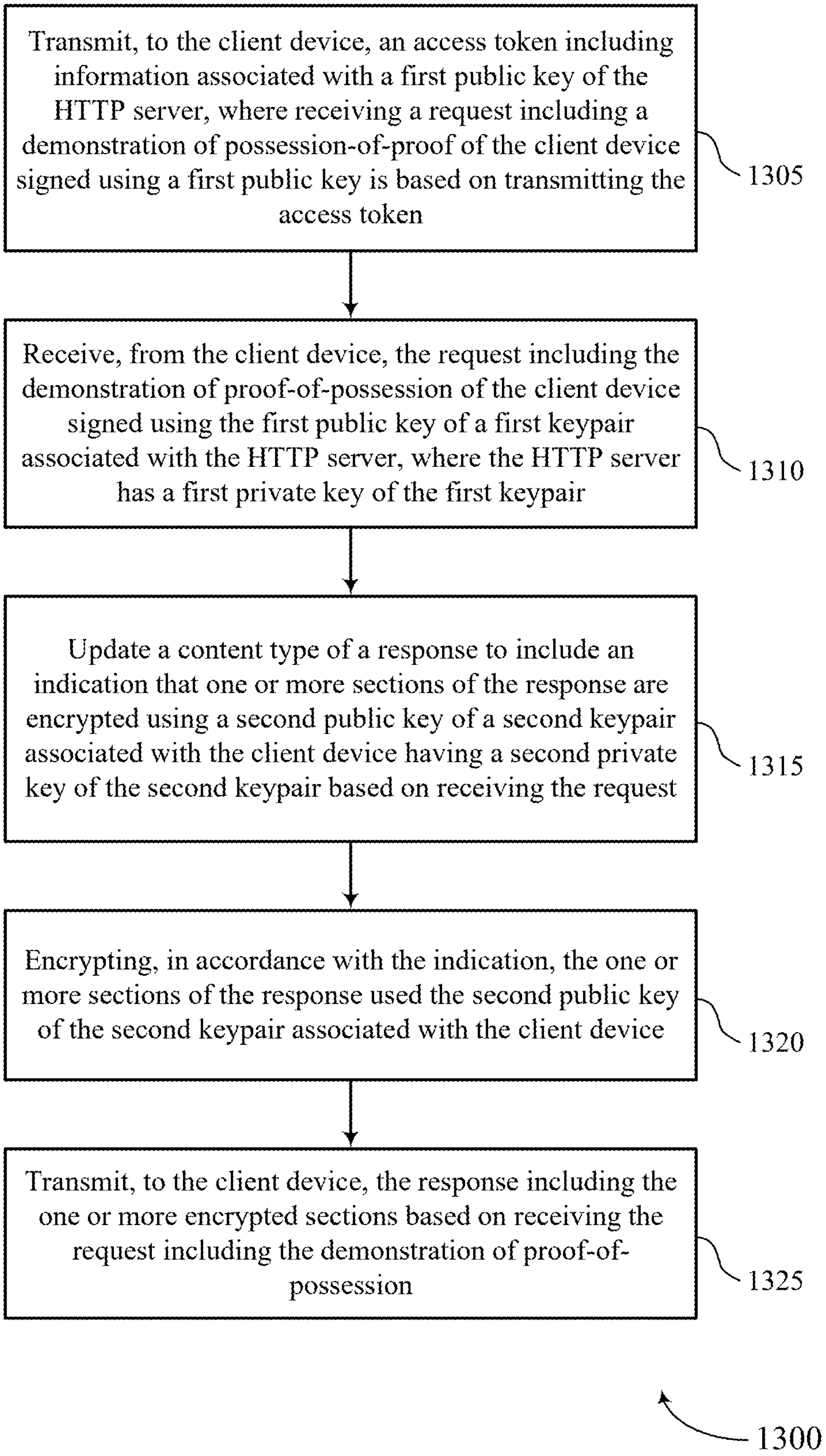

FIG. 13 shows a flowchart illustrating a method 1300 that supports secure request transport across transport layer connections in accordance with aspects of the present disclosure. The operations of the method 1300 may be implemented by an HTTP server or its components as described herein. For example, the operations of the method 1300 may be performed by an HTTP server as described with reference to FIGS. 1 through 3 and 7 through 9. In some examples, an HTTP server may execute a set of instructions to control the functional elements of the HTTP server to perform the described functions. Additionally, or alternatively, the HTTP server may perform aspects of the described functions using special-purpose hardware.

At 1305, the method may include transmitting, to the client device, an access token including information associated with the first public key of the HTTP server, where receiving the request including the DPoP of the client device signed using the first public key is based on transmitting the access token. The operations of 1305 may be performed in accordance with examples as disclosed herein. In some examples, aspects of the operations of 1305 may be performed by an access token manager 845 as described with reference to FIG. 8.

At 1310, the method may include receiving, from the client device, a request including a DPoP of the client device signed using a first public key of a first keypair associated with the HTTP server, where the HTTP server has a first private key of the first keypair. The operations of 1310 may be performed in accordance with examples as disclosed herein. In some examples, aspects of the operations of 1310 may be performed by a DPoP manager 825 as described with reference to FIG. 8.

At 1315, the method may include updating a content type of a response to include an indication that one or more sections of the response are encrypted using a second public key of a second keypair associated with the client device having a second private key of the second keypair based on receiving the request. The operations of 1315 may be performed in accordance with examples as disclosed herein. In some examples, aspects of the operations of 1315 may be performed by a content type manager 830 as described with reference to FIG. 8.

At 1320, the method may include encrypting, in accordance with the indication, the one or more sections of the response using the second public key of the second keypair associated with the client device. The operations of 1320 may be performed in accordance with examples as disclosed herein. In some examples, aspects of the operations of 1320 may be performed by an encryption manager 835 as described with reference to FIG. 8.

At 1325, the method may include transmitting, to the client device, the response including the one or more encrypted sections based on receiving the request including the DPoP. The operations of 1325 may be performed in accordance with examples as disclosed herein. In some examples, aspects of the operations of 1325 may be performed by a response manager 840 as described with reference to FIG. 8.

The following provides an overview of aspects of the present disclosure:

Aspect 1: A computer-implemented method for message encryption between a HTTP server and a client device, comprising: generating, by the client device, a DPoP comprising a signature of a first public key of a first keypair associated with the HTTP server, wherein the HTTP server has a first private key of the first keypair; transmitting, to the HTTP server, a request comprising the demonstration of proof-of possession of the client device; receiving a response from the HTTP server based at least in part on transmitting the request, the response comprising an indication that one or more sections of the response are encrypted using a second public key of a second keypair of the client device; and decrypting, based at least in part on the response comprising the indication, the response using a second private key of the second keypair of the client device.

Aspect 2: The computer-implemented method of aspect 1, further comprising: encrypting one or more second sections of a second response to the response using the first public key of the first keypair associated with the HTTP server; and transmitting the second response to the response, wherein the second response comprises a second indication that one or more second sections of the second response are encrypted using the first public key of the first keypair associated with the HTTP server.

Aspect 3: The computer-implemented method of aspect 2, further comprising: updating a content type of the request to include the second indication based at least in part on generating the DPoP.

Aspect 4: The computer-implemented method of aspect 1, further comprising: encrypting one or more second sections of the request using the first public key of the first keypair associated with the HTTP server, wherein the encrypting comprises encrypting a body of the request, one or more headers of the request, or both using the first public key.

Aspect 5: The computer-implemented method of any of aspects 1 through 4, further comprising: transmitting, to the HTTP server prior to transmission of the request, a message comprising a DPoP header, the DPoP header indicative of the second public key of the second keypair of the client device having the second private key of the second keypair.

Aspect 6: The computer-implemented method of aspect 5, further comprising: receiving, from the HTTP server and based at least in part on sharing the second public key of the second keypair of the client device, an access token bound to an identity of the client device via inclusion of information associated with the second public key.

Aspect 7: The computer-implemented method of any of aspects 1 through 6, further comprising: receiving, from the HTTP server, an access token comprising information associated with the first public key of the HTTP server; and identifying the first public key of the HTTP server based at least in part on receiving the access token.

Aspect 8: The computer-implemented method of aspect 7, wherein the access token comprises a JWT, and the information associated with the first public key comprises a signature of the JWT.

Aspect 9: The computer-implemented method of any of aspects 1 through 8, wherein receiving the response comprises: receiving the response from the HTTP server based at least in part on a validation of the DPoP via the first private key of the first keypair of the HTTP server.

Aspect 10: The computer-implemented method of any of aspects 1 through 9, wherein transmitting the request, receiving the response, or both are performed via an untrusted TLS connection.

Aspect 11: The computer-implemented method of any of aspects 1 through 10, wherein the one or more sections of the response are indicated as encrypted via an extension or value included in content of the response preceding the one or more sections.

Aspect 12: The computer-implemented method of any of aspects 1 through 11, wherein the DPoP further comprises, in addition to the signature of the first public key, a URI, a HTTP, a timestamp, an expiration time, a unique identifier, or any combination thereof associated with the request.

Aspect 13: A computer-implemented method for message encryption between a HTTP server and a client device, comprising: receiving, from the client device, a request comprising a DPoP of the client device signed using a first public key of a first keypair associated with the HTTP server, wherein the HTTP server has a first private key of the first keypair; updating a content type of a response to include an indication that one or more sections of the response are encrypted using a second public key of a second keypair associated with the client device having a second private key of the second keypair based at least in part on receiving the request; encrypting, in accordance with the indication, the one or more sections of the response using the second public key of the second keypair associated with the client device; and transmitting, to the client device, the response comprising the one or more encrypted sections based at least in part on receiving the request comprising the DPoP.

Aspect 14: The computer-implemented method of aspect 13, wherein encrypting the one or more sections comprises: encrypting a body of the response, one or more headers of the response, or both using the second public key.

Aspect 15: The computer-implemented method of any of aspects 13 through 14, further comprising: receiving, from the client device prior to receipt of the request, a message comprising a DPoP header, the DPoP header indicative of the second public key of the second keypair of the client device having the second private key of the second keypair.

Aspect 16: The computer-implemented method of aspect 15, further comprising: transmitting, to the client device and based at least in part on receiving the second public key of the second keypair of the client device, an access token bound to an identity of the client device via inclusion of information associated with the second public key.

Aspect 17: The computer-implemented method of any of aspects 13 through 16, further comprising: transmitting, to the client device, an access token comprising information associated with the first public key of the HTTP server, wherein receiving the request comprising the DPoP of the client device signed using the first public key is based at least in part on transmitting the access token.

Aspect 18: The computer-implemented method of aspect 17, wherein the access token comprises a JWT, and the information associated with the first public key comprises a signature of the JWT.

Aspect 19: The computer-implemented method of any of aspects 13 through 18, further comprising: validating the DPoP using the first private key of the first keypair of the HTTP server, wherein transmitting the response is based at least in part on validating the DPoP.

Aspect 20: The computer-implemented method of any of aspects 13 through 19, further comprising: decrypting, based at least in part on the request including a second indication that one or more second sections of the request are encrypted using the first public key of the first keypair associated with the HTTP server, the one or more second sections of the request using the first private key of the first keypair of the HTTP server, wherein transmitting the response is based at least in part on decrypting the one or more second sections of the request.

Aspect 21: The computer-implemented method of any of aspects 13 through 20, wherein encrypting the one or more sections is based at least in part on a second indication of the request, an encryption of the request, or both.

Aspect 22: The computer-implemented method of any of aspects 13 through 21, wherein receiving the request, transmitting the response, or both are performed via an untrusted TLS connection.

Aspect 23: The computer-implemented method of any of aspects 13 through 22, wherein the one or more sections of the response are indicated as encrypted via an extension or value included in content of the response preceding the one or more sections.

Aspect 24: The computer-implemented method of any of aspects 13 through 23, wherein the DPoP further comprises, in addition to a signature of the first public key, a URI, a HTTP, a timestamp, an expiration time, a unique identifier, or any combination thereof associated with the request.

Aspect 25: An apparatus for message encryption between a HTTP server and a client device, comprising one or more memories storing processor-executable code, and one or more processors coupled with the one or more memories and individually or collectively operable to execute the code to cause the apparatus to perform a method of any of aspects 1 through 12.

Aspect 26: An apparatus for message encryption between a HTTP server and a client device, comprising at least one means for performing a method of any of aspects 1 through 12.

Aspect 27: A non-transitory computer-readable medium storing code for message encryption between a HTTP server and a client device, the code comprising instructions executable by one or more processors to perform a method of any of aspects 1 through 12.

Aspect 28: An apparatus for message encryption between a HTTP server and a client device, comprising one or more memories storing processor-executable code, and one or more processors coupled with the one or more memories and individually or collectively operable to execute the code to cause the apparatus to perform a method of any of aspects 13 through 24.

Aspect 29: An apparatus for message encryption between a HTTP server and a client device, comprising at least one means for performing a method of any of aspects 13 through 24.

Aspect 30: A non-transitory computer-readable medium storing code for message encryption between a HTTP server and a client device, the code comprising instructions executable by one or more processors to perform a method of any of aspects 13 through 24.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for message encryption between a hypertext transfer protocol (HTTP) server and a client device, comprising:

generating, by the client device, a demonstration of proof-of-possession comprising a signature of a first public key of a first keypair associated with the HTTP server, wherein the HTTP server has a first private key of the first keypair;

transmitting, to the HTTP server, a message comprising a demonstration of proof-of-possession header, the demonstration of proof-of-possession header indicative of a second public key of a second keypair associated with the client device, wherein the client device has a second private key of the second keypair;

transmitting, to the HTTP server, a request comprising the demonstration of proof-of-possession of the client device;

receiving a response from the HTTP server based at least in part on transmitting the request, the response comprising an indication that one or more sections of the response are encrypted by the HTTP server and using the second public key of the second keypair associated with the client device, wherein one or more other sections of the response are unencrypted; and decrypting, based at least in part on the response comprising the indication, the response using the second private key of the second keypair associated with the client device.

2. The computer-implemented method of claim 1, further comprising:

encrypting one or more second sections of a second response to the response using the first public key of the first keypair associated with the HTTP server; and transmitting the second response to the response, wherein the second response comprises a second indication that the one or more second sections of the second response are encrypted using the first public key of the first keypair associated with the HTTP server.

3. The computer-implemented method of claim 2, further comprising:

updating a content type of a second request to include the second indication based at least in part on generating the demonstration of proof-of-possession.

4. The computer-implemented method of claim 1, further comprising:

encrypting one or more second sections of the request using the first public key of the first keypair associated with the HTTP server, wherein the encrypting comprises encrypting a body of the request, one or more headers of the request, or both using the first public key.

5. The computer-implemented method of claim 1, further comprising:

receiving, from the HTTP server and based at least in part on sharing the second public key of the second keypair of the client device, an access token bound to an identity of the client device via inclusion of information associated with the second public key.

6. The computer-implemented method of claim 1, further comprising:

receiving, from the HTTP server, an access token comprising information associated with the first public key of the HTTP server; and identifying the first public key of the HTTP server based at least in part on receiving the access token.

7. The computer-implemented method of claim 1, wherein receiving the response comprises:

receiving the response from the HTTP server based at least in part on a validation of the demonstration of proof-of-possession via the first private key of the first keypair of the HTTP server.

8. The computer-implemented method of claim 1, wherein the one or more sections of the response are indicated as encrypted via an extension or value included in content of the response preceding the one or more sections.

9. A computer-implemented method for message encryption between a hypertext transfer protocol (HTTP) server and a client device, comprising:

receiving, from the client device, a message comprising a demonstration of proof-of-possession header, the demonstration of proof-of-possession header indicative of a second public key of a second keypair associated with the client device, wherein the client device has a second private key of the second keypair;

receiving, from the client device, a request comprising a demonstration of proof-of-possession of the client device signed using a first public key of a first keypair associated with the HTTP server, wherein the HTTP server has a first private key of the first keypair;

updating a content type of a response to include an indication that one or more sections of the response are encrypted using the second public key of the second keypair associated with the client device based at least in part on receiving the request, wherein one or more other sections of the response are unencrypted;

encrypting, by the HTTP server and in accordance with the indication, the one or more sections of the response using the second public key of the second keypair associated with the client device; and transmitting, to the client device, the response comprising the one or more encrypted sections based at least in part on receiving the request comprising the demonstration of proof-of-possession.

10. The computer-implemented method of claim 9, wherein encrypting the one or more sections comprises:

encrypting a body of the response, one or more headers of the response, or both using the second public key.

11. The computer-implemented method of claim 9, further comprising:

transmitting, to the client device and based at least in part on receiving the second public key of the second keypair of the client device, an access token bound to an identity of the client device via inclusion of information associated with the second public key.

12. The computer-implemented method of claim 9, further comprising:

transmitting, to the client device, an access token comprising information associated with the first public key of the HTTP server, wherein receiving the request comprising the demonstration of proof-of-possession of the client device signed using the first public key is based at least in part on transmitting the access token.

13. The computer-implemented method of claim 9, further comprising:

validating the demonstration of proof-of-possession using the first private key of the first keypair of the HTTP server, wherein transmitting the response is based at least in part on validating the demonstration of proof-of-possession.

14. The computer-implemented method of claim 9, further comprising:

decrypting, based at least in part on the request including a second indication that one or more second sections of the request are encrypted using the first public key of the first keypair associated with the HTTP server, the one or more second sections of the request using the first private key of the first keypair of the HTTP server, wherein transmitting the response is based at least in part on decrypting the one or more second sections of the request.

15. The computer-implemented method of claim 9, wherein encrypting the one or more sections is based at least in part on a second indication of the request, an encryption of the request, or both.

16. The computer-implemented method of claim 9, wherein the one or more sections of the response are indicated as encrypted via an extension or value included in content of the response preceding the one or more sections.

17. An apparatus for message encryption between a hypertext transfer protocol (HTTP) server and a client device, comprising:

one or more memories storing processor-executable code; and one or more processors coupled with the one or more memories and individually or collectively operable to execute the code to cause the apparatus to:

generate, by the client device, a demonstration of proof-of-possession comprising a signature of a first public key of a first keypair associated with the HTTP server, wherein the HTTP server has a first private key of the first keypair;

transmit, to the HTTP server, a message comprising a demonstration of proof-of-possession header, the demonstration of proof-of-possession header indicative of a second public key of a second keypair associated with the client device, wherein the client device has a second private key of the second keypair;

transmit, to the HTTP server, a request comprising the demonstration of proof-of-possession of the client device;

receive a response from the HTTP server based at least in part on transmitting the request, the response comprising an indication that one or more sections of the response are encrypted by the HTTP server and using the second public key of the second keypair associated with the client device, wherein one or more other sections of the response are unencrypted; and decrypting, based at least in part on the response comprising the indication, the response using the second private key of the second keypair associated with the client device.

18. The apparatus of claim 17, wherein the one or more processors are individually or collectively further operable to execute the code to cause the apparatus to:

encrypt one or more second sections of a second response to the response using the first public key of the first keypair associated with the HTTP server; and transmit the second response to the response, wherein the second response comprises a second indication that the one or more second sections of the second response are encrypted using the first public key of the first keypair associated with the HTTP server.

* * * * *